US008891619B2

United States Patent
Leontaris et al.

(10) Patent No.: US 8,891,619 B2
(45) Date of Patent: Nov. 18, 2014

(54) RATE CONTROL MODEL ADAPTATION BASED ON SLICE DEPENDENCIES FOR VIDEO CODING

(75) Inventors: Athanasios Leontaris, Burbank, CA (US); Alexandros Tourapis, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 633 days.

(21) Appl. No.: 12/999,150

(22) PCT Filed: Jun. 15, 2009

(86) PCT No.: PCT/US2009/047317
§ 371 (c)(1),
(2), (4) Date: Dec. 15, 2010

(87) PCT Pub. No.: WO2010/005691
PCT Pub. Date: Jan. 14, 2010

(65) Prior Publication Data
US 2011/0090960 A1    Apr. 21, 2011

Related U.S. Application Data

(60) Provisional application No. 61/061,941, filed on Jun. 16, 2008.

(51) Int. Cl.
*H04N 7/12*         (2006.01)
*H04N 11/02*        (2006.01)
(Continued)

(52) U.S. Cl.
CPC ..... *H04N 19/00145* (2013.01); *H04N 19/0043* (2013.01); *H04N 19/00163* (2013.01); *H04N 19/002* (2013.01); *H04N 19/00157* (2013.01); *H04N 19/00078* (2013.01); *H04N 19/0266* (2013.01); *H04N 19/00363* (2013.01); *H04N 19/0009* (2013.01); *H04N 19/00721* (2013.01); *H04N 19/00193* (2013.01); *H04N 19/00181* (2013.01); *H04N 19/00472* (2013.01)
USPC ............ 375/240.12; 375/240.01; 375/240.03; 375/240.08; 382/154

(58) Field of Classification Search
None
See application file for complete search history.

(56) References Cited

U.S. PATENT DOCUMENTS 5,872,598 A   2/1999   Legall
5,929,916 A   7/1999   Legall
(Continued)

FOREIGN PATENT DOCUMENTS

CN   1471319   1/2004
EP   1202579   5/2002
(Continued)

OTHER PUBLICATIONS

Yang, et al., "Rate Control for H.264 with Two-Step Quantization Parameter Determination but Single-Pass Encoding", Hindawi Publishing Corporation; EURASIP Journal on Applied Signal Processing, vol. 2006, Article ID 63409, pp. 1-13.

(Continued)

*Primary Examiner* — Joseph Ustaris
*Assistant Examiner* — Ellyar Y Barazesh

(57) ABSTRACT

Statistics for estimating quantization factors of a coding-unit type (e.g., B-coded or I-coded) pictures are determined from other, possibly different (e.g., P-coded) pictures, or previously coded coding-units. Bit rate and quality relationships between such coding-unit types may be used with the quantization parameters. Estimating bit rate and quality relationships between coding-unit types enables accurate rate control for pictures regardless of their coding-unit type. Bit rate and quality relationships between coding-unit types can be used with multiple rate control models to increase compression. Rate control parameters may be adjusted with statistics generated by a motion estimation and compensation framework. Rate control performance may be controlled in transcoding compressed bit streams.

15 Claims, 15 Drawing Sheets

(51) Int. Cl.
*H04N 11/04* (2006.01)
*G06K 9/00* (2006.01)
*H04N 19/137* (2014.01)
*H04N 19/31* (2014.01)
*H04N 19/142* (2014.01)
*H04N 19/154* (2014.01)
*H04N 19/14* (2014.01)
*H04N 19/12* (2014.01)
*H04N 19/194* (2014.01)
*H04N 19/124* (2014.01)
*H04N 19/577* (2014.01)
*H04N 19/152* (2014.01)
*H04N 19/149* (2014.01)
*H04N 19/40* (2014.01)

(56) References Cited

U.S. PATENT DOCUMENTS

| | | | |
|---|---|---|---|
| 6,192,079 | B1 | 2/2001 | Sharma |
| 6,192,080 | B1 | 2/2001 | Sun |
| 6,192,081 | B1 | 2/2001 | Chiang |
| 6,343,098 | B1 | 1/2002 | Boyce |
| 6,366,704 | B1 | 4/2002 | Ribas-Corbera |
| 6,963,608 | B1* | 11/2005 | Wu .................. 375/240.03 |
| 6,999,513 | B2 | 2/2006 | Sohn |
| 7,010,034 | B2 | 3/2006 | Bruls |
| 7,130,349 | B1 | 10/2006 | Yang |
| 7,349,474 | B2 | 3/2008 | Bagni |
| 7,623,719 | B2 | 11/2009 | Molino |
| 7,715,475 | B1* | 5/2010 | Puri et al. .................. 375/240 |
| 2003/0039310 | A1 | 2/2003 | Wu |
| 2004/0013202 | A1 | 1/2004 | Lainema |
| 2005/0036549 | A1 | 2/2005 | He |
| 2005/0047508 | A1 | 3/2005 | Ha |
| 2005/0078750 | A1 | 4/2005 | Shen |
| 2005/0169369 | A1 | 8/2005 | Lee |
| 2005/0175091 | A1 | 8/2005 | Puri |
| 2005/0195896 | A1 | 9/2005 | Huang |
| 2006/0034369 | A1* | 2/2006 | Mohsenian .............. 375/240.03 |
| 2006/0045181 | A1 | 3/2006 | Chen |
| 2006/0078051 | A1 | 4/2006 | Liang |
| 2006/0083308 | A1 | 4/2006 | Schwarz |
| 2006/0083309 | A1 | 4/2006 | Schwarz |
| 2006/0104360 | A1 | 5/2006 | Gordon |
| 2006/0140273 | A1 | 6/2006 | Wu |
| 2006/0146932 | A1 | 7/2006 | Panusopone |
| 2007/0064793 | A1 | 3/2007 | Wang |
| 2007/0071105 | A1* | 3/2007 | Tian et al. ................. 375/240.24 |
| 2007/0274384 | A1* | 11/2007 | Schwarz et al. ......... 375/240.12 |
| 2008/0151998 | A1* | 6/2008 | He .......................... 375/240.03 |
| 2009/0168891 | A1 | 7/2009 | Cheong |

FOREIGN PATENT DOCUMENTS

| | | |
|---|---|---|
| EP | 1949699 | 7/2008 |
| KR | 20020043749 | 6/2002 |
| KR | 20020043833 | 6/2002 |
| KR | 20080066684 | 7/2008 |
| WO | 9716031 | 5/1997 |
| WO | 2006042611 | 4/2006 |
| WO | 2007035147 | 3/2007 |
| WO | 2007038230 | 4/2007 |
| WO | 2007058515 | 5/2007 |
| WO | 2005011255 | 11/2008 |
| WO | 2010005691 | 1/2010 |

OTHER PUBLICATIONS

Zhang, et al., "Key Techniques of Bit Rate Reduction for H.264 Streams", PCM 2004, LNCS 3332, pp. 985-992; copyright Springer-Verlag Berlin Heidelberg 2004.

Jang, et al., "An Adaptive Non-Linear Motion Vector Resampling Algorithm for Down-Scaling Video Transcoding", pp. II-229-232; 2003.

Miloslavsky, et al, "Rate Control for Layered Video Compression Using Matching Pursuits", pp. 357-361, 1993.

Chang, et al al, "A Simple Rate Control Framework for Single-Pass Variable Bit Rate MPEG Encoder", pp. 625-628, 2002.

Xu, et al., "Rate Control for Scalable Video Model", Proc. of SPIE vol. 5960 (SPIE, Bellingham, WA, 2005); pp. 59601L-1 to 10.

Kwon, et al., "An Operational Rate Control Scheme for H.264 with Two-Stage Encoding", Proc. of SPIE vol. 5909, 590910, (2005); pp. 590910-1 to 10.

Xin, et al., "Digital Video Transcoding", Proceedings of the IEEE, vol. 93, No. 1, Jan. 2005, pp. 84-97.

Kim, et al., "Transcoding DV Into MPEG-2 in the DCT Domain", Partof the IS&T/SPIE Conference on Visual Communications and Imacie Processing '99 • San Jose, California • Jan. 1999 SPIE vol. 3653, pp. 1026-1032.

Fang, et al., "Hardware Oriented Rate Control Algorithm and Implementation for Realtime Video Coding", 2003, pp. III 421-424.

Hall, et al., "A Robust Scene Cut Detection and Reaction Apparatus for MPEG Video Encoding", IP.com, original publication date: Feb. 1, 1999.

Li, et al., "Adaptive Basic Unit Layer Rate Control for JVT", 7th meeting, Pattaya II, Thailand, Mar. 2003, pp. 1-31.

Lee, et al., "Scalable Rate Control for MPEG-4 Video", vol. 10, No. 6, Sep. 2000, pp. 878-894.

Vetro, et al., "MPEG-4 Rate Control for Multiple Video Objects", vol. 9 Issue, Publication Date: Feb. 1999, pp. 186-199.

Lim, et al., "Text Description of Joint Model Reference Encoding Methods and Decoding Concealment Methods", Hong Kong, Jan. 2005, pp. 1-39.

Mohsenian, et al., "Single-pass constant-and variable-bit-rate MPEG-2 Video Compression", vol. 43, Issue 4, published: Jul. 1999, pp. 489-509.

Ma, et al., "Rate Control on JVT Standard", 4th meeting: Klagenfurt, Austria, Jul. 22-26, 2002; pp. 1-11.

Ma, et al., "Improved Rate Control Algorithm", 5th meeting: Geneva, CH, Oct. 9-17, 2002; pp. 1-10.

Chiang, et al., "A New Rate Control Scheme Using Quadratic Rate Distortion Model", published 1997, pp. 246-250.

Ribas-Corbera, et al., "Rate Control in DCT Video Coding for Low-Delay Communications", vol. 9, No. 1, Feb. 1999, pp. 172-185.

Ortega, et al., "Rate-Distortion Methods for Image and Video Compression", Nov. 1998, pp. 23-50.

Sullivan, et al., "Rate-Distortion Optimization for Video Compression", Nov. 1998, pp. 74-90.

Ramchandran, et al., "Bit Allocation for Dependent Quantization with Applications to Multiresolution and MPEG Video Coders", vol. 3, No. 5, Sep. 1994, pp. 533-545.

Leontaris, et al., "End-to-End Delay for Hierarchical B-Pictures and Pulsed Quality Dual Frame Video Coders", Published: Oct. 8-11, 2006, pp. 3133-3136.

He, et al., "Low-Delay Rate Control for DCT Video Coding via a Domain Source Modeling", vol. 11, Issue 8, published on Aug. 2001, pp. 928-940.

Ghandi, et al., "A Lagrangian Optimized Rate Control Algorithm for the H.264/AVC Encoder", vol. 1, publication date: Oct. 24-27, 2004, pp. 123-126.

Ramchandran, et al., "Rate-Distortion Optimal Fast Thresholding with Complete JPEG/MPEG Decoder Compatibility", vol. 3, Issue 5, Publication date: Sep. 1994, pp. 700-704.

Watson, "Perceptual Optimization of DCT Color Quantization Matrices", vol. 1, publication date; Nov. 13-16, 1994, pp. 100-104.

"Advanced Video Coding for Generic Audiovisual Services" ITU H.264, Mar. 2010, pp. 1-653.

"VC-1 Compressed Video Bistream Format and Decoding Process" SMPTE Standard 421M-2006; pp. 1-493.

Westerink, et al., "Two-pass MPEG-2 Variable-Bit-Rate Encoding", vol. 43, Issue 4, Publication Date: Jul. 1999, pp. 471-488.

"Generic Coding of Moving Pictures and Associated Audio Information: Video" ITU-T, Feb. 2000, pp. 1-220.

"Coding of Moving Pictures and Associated Audio", Test Model 5.

Yu, et al., "Optimal Thresholding for MPEG-based Video Coding", Tech. Report Electr. Eng. Department, Center for Telecommunications, Columbia University.

(56) References Cited

OTHER PUBLICATIONS

Zhou, Digital Video Broadcasting with Improved Picture Quality; Optimizationof MPEG-2 Video Coding, Chapter 4, Chapter 5 and Chapter 11; Berlin Germany, Aug. 1, 1997, pp. 41-56, 57.
Leontaris A, et al. "Rate Control Reorganization in the JM reference Softwarre" Apr. 27, 2007 XP030007002 paragraph (0003).

W-N. Lie, et al., "Two-pass Rate-Distortion Optimized Rate Control Technique for H.264/AVC Video" Visual Communications and Image Processing; Jul. 12, 2005-Jul. 15, 2005; Beijing, Jul. 12, 2005, XP030080948.
Athanasios, Leontaris, et al., "Rate Control for Video Coding with Slice Type Dependencies" Image Processing 2008, Oct. 12, 2008, pp. 2792-2795, XP031374621, ISBN: 978-1-4244-1765-0.

* cited by examiner

RATE CONTROL MODEL ADAPTATION BASED ON SLICE DEPENDENCIES FOR VIDEO CODING

CROSS-REFERENCE TO RELATED APPLICATION AND PRIORITY CLAIM

The present Application is related and claims priority to and benefit of U.S. Provisional Patent Application No. 61/061,941, filed on 16 Jun. 2008 by Athanasis Leontaris and Alexandros Tourapis, entitled Rate Control Model Adaptation Based on Slice Dependencies for Video Coding, and assigned to the Assignee of the present Application.

TECHNOLOGY

Embodiments of the present invention relate to the treatment of video information.

BACKGROUND

Rate control is an integral component of modern video compression systems. A compressed bit stream satisfies specific bandwidth and delay constraints that are imposed by the transmission medium. These constraints can be satisfied through rate control. Rate control algorithms vary the number of bits allocated to each picture, color component, set of blocks, or individual blocks, so that encoder and decoder buffer overflows and underflows may be avoided, and the target bit rate may be achieved with high accuracy. Optionally, a rate control algorithm may attempt to maintain consistently high visual quality. Such above-mentioned goals may compete with each other, which may contribute to a complex optimization problem. Notwithstanding, pictures in a compressed video bit stream can be encoded in a variety of arrangements, using for example, intra-predicted (I), uni-predicted (P), and bi-predicted (B) slices. A slice comprises one or more macroblocks in a picture that are coded using the same prediction type: I-, P-, or B-. A picture can be coded using a single or multiple slices, which do not have to be of the same type. For rate control purposes, a slice may be further subdivided into one or more rate control basic units (e.g., a collection of macroblocks), which are coded using the same coding parameters. A basic unit may be defined using a raster scan order, may be arbitrary, or may depend on objects within a scene. A basic unit may also be a collection of adjacent pictures. It should be appreciated that within this document the terms basic unit, slice, picture, and frame may be used interchangeably, depending on context. Bit rate and quality statistics may vary greatly between different types of slices. Modem rate control algorithms may gather statistics for rate control basic units of a single slice type and apply the gathered statistics on rate control basic units of such type alone, while for other slice types heuristic rate control methods may be employed. Performing rate control on slice types or basic units may employ separate and possibly different rate control models, which may achieve more accurate rate control and potentially improve the visual quality of the compressed bit stream. However, using separate rate control models may impose a computational cost.

An objective of a video compression system is high compression performance, e.g., to achieve the lowest possible distortion given a fixed target number of bits for the compressed bit stream or equivalently to send the minimum possible number of bits for a fixed distortion value. An example of distortion measurement is peak signal-to-noise ratio (PSNR). Video encoders produce a compressed bit stream such that when a compliant decoder mechanism (decoder) decodes the compressed bit stream, a reconstructed video sequence is generated that can be displayed and viewed at a receiver side. It should be appreciated that a storage or transmission medium can send such compressed bit stream to a receiver to be decoded in a variety of transport modes. Each one of these transport modes can have different delay and bandwidth applications. For example:

(a) the compressed bit stream can be stored and transported on an optical or magnetic disk, or on non-volatile computer memory;

(b) a user can download the compressed bit stream from some remote server on the internet and view the reconstructed video off-line at some later time;

(c) the user can stream the compressed bit stream from a remote internet server and view the compressed bit stream with a small time delay on the client computer or device; and (d) the compressed bit stream can be the result of either real-time interactive video communication (e.g., video-conferencing) or live-event video streaming (e.g., sports), etc.

For real-time communication, low end-to-end delays may improve quality of service to users. Somewhat higher end-to-end delays may be expected for live-event streaming, video-conferencing, etc. Optical and magnetic disk storage and movie downloads may tolerate greater delays, e.g., because decoding and display on a computer may have available buffering space. It has been found that internet streaming of movies or TV shows can allow for additional delay compared to live-event streaming and render a same amount of satisfaction to a viewer. It has also been found that end-to-end delay may be affected by the communication channel (or "pipe") as well as video coder prediction structure. For instance, some video coders buffer future frames prior to coding the current frame to improve compression performance. However, buffering future frames may increase delay.

It should be appreciated that the capacity of the data pipe can vary for each transport medium. For example, optical and magnetic disk storage can be very generous in terms of bandwidth. High-capacity storage mediums such as Blu-Ray or HD-DVD disks have an upper limit on bit capacity and decoder buffer size. Off-line playback may not be constrained with respect to bandwidth, because the bit stream is viewed offline. However, practical configurations may relate to buffering delay and hard drive storage space. Internet streaming and real-time interactive video communication can be affected by the bandwidth of the networks used to transport the bit streams. In addition, bit streams generated for one transport medium might not be suitable for transmission through a different transport medium. For example, a bit stream that is stored on an optical disk (e.g., DVD) may be compressed at a bit rate such as 5 Mbps. Streaming the same bitstream online over a network that lacks bandwidth to support such a bit rate may affect performance.

A mechanism for generating compressed bit streams that satisfy the bandwidth and delay constraints is rate control. Rate control may minimize visual distortion, generates bits that fit the communication channel, and may deter decoder input buffer overflow or starvation (e.g., that may result in an underflow.) For instance, a compliant bit stream may satisfy two constraints with respect to the decoder buffer:

(a) received picture bits fit in the buffer (otherwise results in a buffer overflow), and (b) when the decoder removes a picture from the buffer to decode the picture, the picture is received in its entirety (otherwise results in buffer underflow or starvation.)

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention.

Example embodiments are described herein according to the following outline:

1.0 General Overview;
2.0 Overview of Rate Control Model Adaptation Based on Coding-Unit Dependencies for Video Coding;
   2.0.1 An Example First Technique—Rate Control Modeling,
   2.0.2 An Example Second Technique—Gathering Statistics,
   2.0.3 An Example Third Technique—Bit Allocation, and
   2.0.4 An Example Fourth Technique—Transcoding;
3.0 Example Implementation Mechanisms;
4.0 Enumerated Example Embodiments; and
5.0 Equivalents, Extensions, Alternatives & Miscellaneous.

1.0 General Overview

Figure 1:
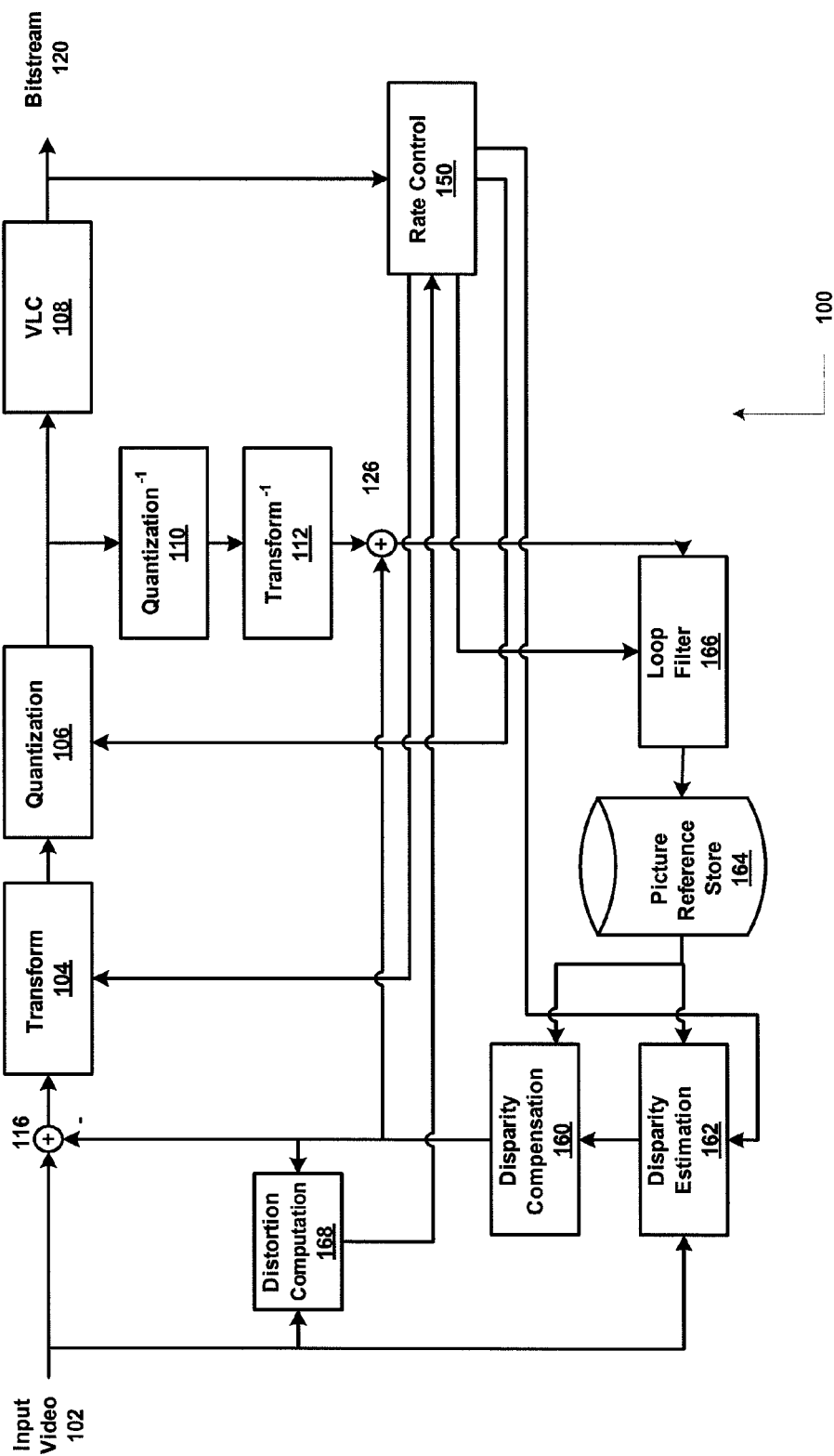
FIG. 1 is a schematic diagram illustrating an example implementation of a rate control scheme within a video encoder, according to an embodiment.

FIG. 1 shows an example implementation of rate control model 100 within a video encoder. The mechanism of rate control can generate compressed bit streams that satisfy the bandwidth, delay, and quality constraints of the video system. Rate control can satisfy the bit rate targets while deterring decoder input buffer overflow or starvation. Optionally, rate control can also function to reduce distortion for a given bit rate target and delay/buffering constraints.

In FIG. 1 the input video 102 is sent to an adder 116 that subtracts from the input video 102 the output of a disparity compensation, e.g., prediction, block 160. The disparity compensation block 160 can perform, for example, intra or inter prediction (e.g., motion compensation and weighted prediction) using pixel samples from the picture reference store block 164 and the coding mode that is communicated to it from the disparity estimation block 162. The disparity estimation block 162 performs inter prediction (e.g., motion estimation and weighted prediction), intra prediction, and mode decision using as input the input video 102 and pixel samples from the picture reference store block 164. It selects the best inter or intra coding mode by minimizing some kind of metric, e.g., the sum of absolute or squared differences between the original samples and their prediction or by considering more elaborate methods such as rate-distortion-optimized Lagrangian minimization. The output from the adder 116 is coupled to a transform block 104, followed by a quantization block 106. The quantization block 106 and the transform block 104 also receive an input from the rate control 150. The transform block 104, apart from the transformation of the residual data, can be instructed by the rate control block 150 to adjust the transform matrices. The quantization block 106, apart from the quantization process of the transformed coefficients, can be instructed by the rate control block 150 to perform one of the following tasks: (a) adjust the quantization matrices; (b) adjust or selectively zero out (threshold) certain quantized coefficient samples; (c) adjust the quantization rounding offsets, (d) perform rate distortion optimized quantization, among others. The output of the quantization block 106 is coupled to a variable length coder (VLC) block 108 and an inverse quantization block 110. The bit stream 120 results from the VLC block 108 and information about the encoding process, such as the number of bits used to encode a block, region, or image, and the distortion introduced by such decision, are sent to the rate control 150.

The rate control 150 also receives an input from the disparity estimation block 160 and the distortion computation block 168, and has an output to the disparity estimation block 162, the transform block 104, the loop filter 166, and the quantization block 106. The distortion computation block 168 computes a distortion metric between the input video 102 and its prediction from the disparity compensation block 160. The disparity estimation block 162 can be instructed by the rate control block 150 to perform tasks, which may include one or more of: (a) selectively enable and disable motion compensation block sizes; (b) use certain pictures as motion compensation references; (c) adjust the motion estimation search range or other motion estimation parameters (e.g., thresholds or search patterns); (d) adjust the number of iterations in joint bi-predictive motion estimation; (e) selectively enable and disable intra-prediction modes; (f) select a particular coding mode (e.g., skip mode), among others. The loop filter block 166 can be instructed by the rate control block 150 to perform one of the following tasks: (a) adjust the parameters of the in-loop deblocking filter; (b) switch-off the deblocking filter, among others.

The inverse transform block 112 receives an input from the inverse quantization block 110 and sends an output to an adder 126. The adder 126 receives the signal from the inverse transform block 112 and the disparity compensation block 160, and sends a summed signal to a loop filter 166. A picture reference store 164 receives an input from the loop filter 166, and sends an output to the disparity compensation block 160 and the disparity estimation block 162. The disparity estimation block 162 also receives an input from the rate control 150. The loop filter 166 also receives an input from the rate control 150. The input video 102 is also sent to an input of the disparity compensation block 160 and the disparity estimation block 162.

Regarding bit allocation per picture, there are a number of ways with which the number of bits allocated to a picture can be affected. For instance, the number of allocated or spent bits can be controlled by varying different coding parameters such as:

(a) varying a quantization parameter (QP), a parameter value that is used to quantize the residual transform coefficients of a block;
(b) selecting a coding mode that trades-off visual quality for transmitting fewer bits, such as signaling that the entire block should be skipped and a previous one should be copied and displayed in its place;
(c) varying the Lagrangian lambda ("$\lambda$") parameter that is used during Lagrangian rate-distortion optimization of the motion estimation and coding mode decision;
(d) quantizing the transformed coefficients (e.g., using Fourier-type transformations, such as, for example, the discrete cosine transform (DCT) or modified DCT) to a value that is more compressible while resulting in minimal quality degradation or, alternatively, thresholding (zeroing-out) the coefficients. Such quantizing may optionally be implemented by adjusting the rounding offsets during quantization of the DCT coefficients; and
(e) choosing not to code certain pictures and instead signal that such pictures should be skipped such that previous coded pictures are displayed in the place of the skipped pictures (e.g., frame skipping.)

It should be appreciated that rate control may be accomplished primarily by varying the quantization parameter value as the quantization parameter value has a more direct relationship to quality vs. distortion and the bit usage, as compared to other methods. An objective of rate control is to achieve the target bit rate. Another objective of rate control is to achieve the best possible visual quality for the compressed image sequence. Other objectives may comprise satisfying the encoder and decoder buffer constraints, and secondarily, satisfying low computational complexity and memory requirements. The selection of the quantization parameter might employ a simple or a more comprehensive algorithm. A simple rate control algorithm can comprise the following example steps: the first picture in the video sequence is encoded with a predetermined quantization parameter value. An encoder then compares the resulting number of bits with the original bit target. If the resulting number of bits exceeds the bit target, e.g., by a threshold $T_{high}$, then the quantization parameter value for the next picture is incremented to reduce the bit usage. If, on the other hand, the resulting number of bits are considerably less than the bit target, e.g., by a threshold $T_{low}$, the quantization parameter value for the next picture is decremented to increase the bit usage. Otherwise, the same QP may be used. At the limit, the above described heuristic algorithm attains more or less the target bit rate. However, the simplicity of the algorithm may affect video quality, perhaps significantly.

Modern comprehensive rate control algorithms can attain good performance through a variety of features, including using the error between current and predicted pictures (or parts thereof) A block in a current picture is predicted using motion compensation from a block in a previously decoded picture (inter prediction). In other coding arrangements, a block in the current picture can be predicted using pixel values from the same picture (intra prediction). Such techniques are usually referred to as coding modes. The error between the source signal and the prediction (inter or intra) can be computed using different distortion metrics. Commonly, the Mean Squared Error (MSE) or, equivalently, the Summed Squared Error (SSE), and the Mean Absolute Difference (MAD) or, equivalently, the Summed Absolute Difference (SAD) of the (intra or inter) prediction error are employed. The SAD prediction error is an indicator of the difficulty in encoding a particular block. For example, a high SAD prediction error can be the result of prediction error residuals with high entropy, which can prove costly to compress. Consequently, using the knowledge of the prediction error can help make a better selection for the value of the quantization parameter, or in general can help adjust a technique that controls the bit rate. It should be appreciated that the MAD/SAD are just two possible metrics of the prediction error/distortion. Other possible distortion or coding complexity metrics may be contemplated.

The SAD prediction error can be estimated through a model (e.g., linear, quadratic etc.) Alternatively, the SAD prediction error can be computed through multiple-pass encoding, e.g., one pass collects statistics such as the SAD, and such statistics are used by subsequent passes to improve rate control. For coding types that support inter prediction, temporal statistics, which are based on the motion-compensated error variance or SAD, may be significantly more reliable for rate control than spatial statistics, such as the source variance. For coding types that only support intra prediction, spatial statistics, such as the spatial variance, may be preferable. Given a target bit number and an estimated SAD, the quantization parameter value can be estimated by a model, such as a quadratic model. Apart from the SAD and QP model-based techniques discussed hereinabove, other rate control techniques can be employed. For example, other rate control techniques can include the rho-domain rate control. Such rho-domain rate control techniques may be more computationally complex than the quadratic model described earlier, because the rho-domain rate control technique gathers information on a pixel level for every generated transform coefficient. It should be appreciated that such techniques may apply to video compression systems that utilize data-decorrelating transforms including, but not limited to, the widely used DCT transform (and related transforms).

Some initial rate control techniques repeatedly compress each image block with multiple quantization parameters and then select a QP that satisfies bandwidth constraints. Computational costs may however limit the practicality of these techniques for use with real time or low complexity applications. Efficient rate control models may obviate this limitation. A simple rate control model comprises a memory and a decision module. The memory module gathers information relative to the complexity, the bit rate usage, and the content, among others aspects, of the pictures in the image sequence. Such information may be combined to create a model that links the gathered statistics with the bit usage. The model may be updated periodically using information from previously encoded pictures. Computationally resources may be allocated to update the model so that it converges to a desirable state after processing some non-trivial number of coded pictures. When a new picture is to be coded, the model computes the coding parameters that will achieve the input bit target.

An early practical rate control algorithm that selected a single QP for each picture is a model referred to as the Test Model 5 rate control. A complexity measure is computed for each image and is then used to allocate the rate among the pictures, and optionally, in a more granular fashion, among slices of blocks in the pictures to be coded. A model is then used to translate the bit target to the quantization parameter used to code the picture or slice. In Test Model 5, the complexity measure used was the picture or block spatial variance. An alternative complexity measure may be a function of the resulting bits and the quantization parameter used to encode previous pictures. Another approach, where the QP values are optimally allocated among the blocks of a picture, uses the standard deviation/variance values of the motion-compensated residuals of the current picture. A model that translates the bit rate constraint (e.g., achieving the target bit rate) to the quantization parameter may be a quadratic function of the complexity (standard deviation) and the QP.

It should be appreciated that rate control algorithms may select the coding mode (intra or inter, among others) prior to generating and coding the residual DCT coefficients. In this way, the complexity of the block/picture may not need to be computed as the estimate of the complexity may already be known. On the other hand, newer encoding paradigms that can significantly improve visual quality may use Lagrangian rate-distortion optimization to optimize the selection of the coding modes. In a rate-distortion optimized video compression system, motion estimation and coding mode selection can be accomplished by, for example, minimizing the Lagrangian cost function $J=D+\lambda \times R$, where D is the distortion (e.g., SSE, SAD, or other distortion metrics) and R is the actual or an estimate of the bit rate during the encoding process. The Lagrangian parameter $\lambda$ that is used to trade off rate for distortion relates to the rate-distortion slope and may be defined as a function of the quantization parameter. During motion estimation, the rate usage R usually represents the bits used to code the motion parameters of the block, such as motion vectors (information representing the block's motion), reference picture indices, weighted prediction parameters, among others. During mode decision, the rate usage R may represent the bits used to code the entire block with the said coding mode. The rate usage may be precisely computed if high-complexity rate-distortion optimization (RDO) is used, or estimated if low-complexity RDO is used, given the characteristics of the current block and characteristics of its neighbors. Computation of the rate usage for mode decision uses full entropy coding of the prediction residuals and reconstruction of the block. Rate Distortion (RD) optimized mode decision may also consider, apart from multiple coding modes, multiple quantization parameters or adjust other characteristics of a coding unit to determine the one used for encoding. The consideration of multiple quantization parameters during mode decision could improve performance but may also use greater computational resources, perhaps significantly. Furthermore, the comparison of multiple QPs in an RD sense using Lagrangian optimization would make use of a parameter $\lambda$ that is kept constant during the comparison. Thus, to enable a lower-complexity RDO scheme and allow straightforward selection of the Lagrangian $\lambda$ without significantly increasing computational demand, the quantization parameter may be selected prior to the coding mode decision process and the derivation of the prediction residual transform coefficients. It should be appreciated that a variety of rate control algorithms have been proposed that estimate the complexity (e.g., SAD) of the current block prior to encoding the block.

Figure 20:
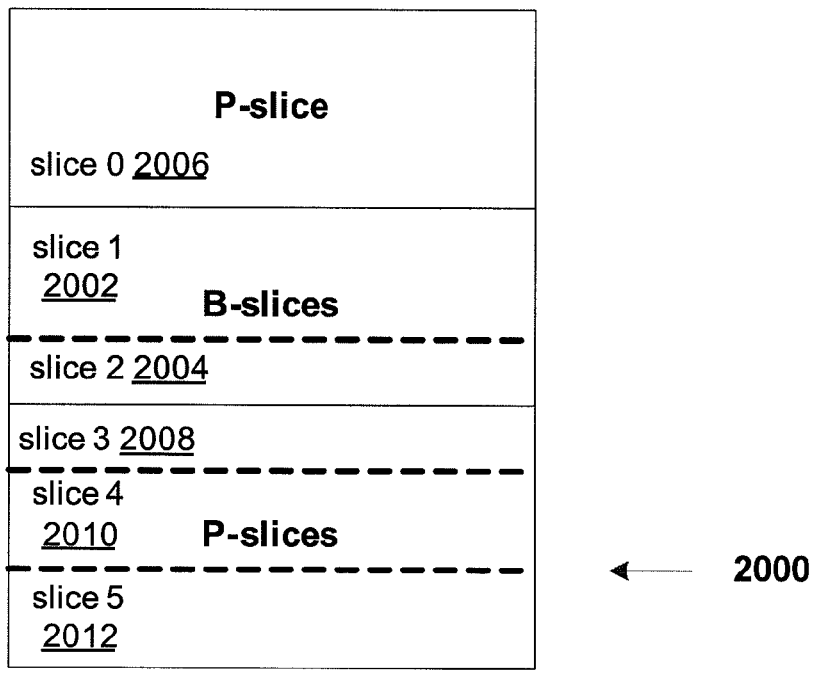
FIG. 20 is a schematic diagram of an example picture coded using multiple slice types, according to an embodiment.
Figure 22:
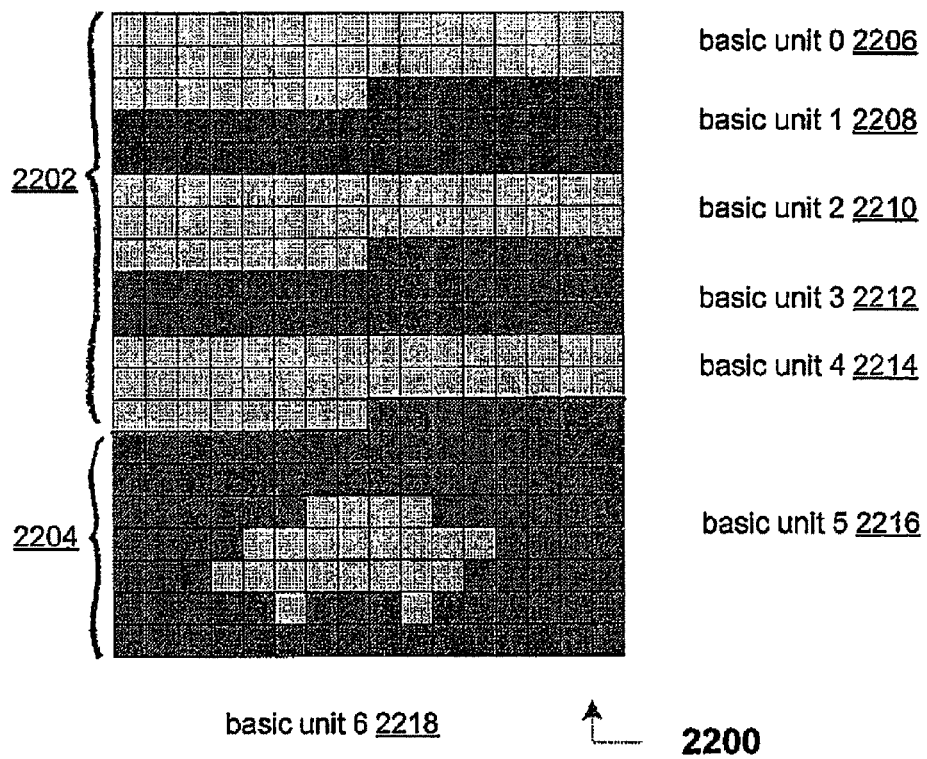
FIG. 22 is a schematic diagram illustrating a basic unit configuration, according to an embodiment.
Figure 23:
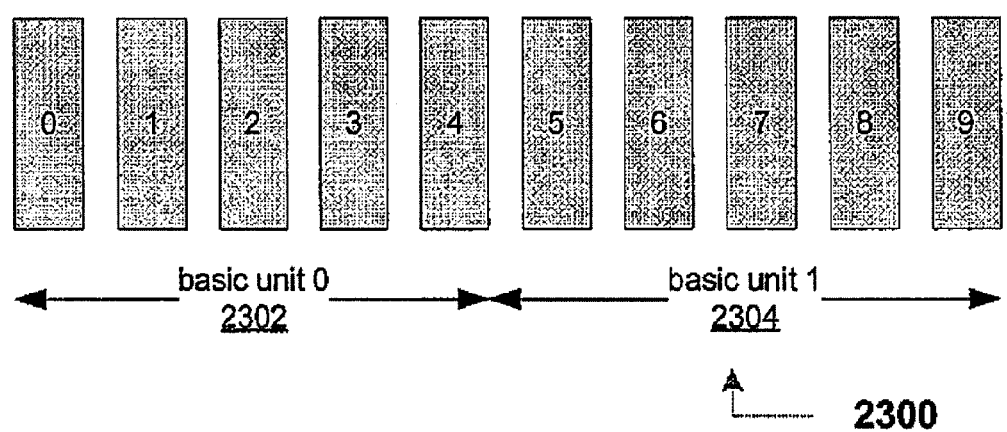
FIG. 23 is a schematic diagram illustrating a basic unit configuration, according to an embodiment.

In modern video codecs such as H.264/AVC, VC-1, and MPEG-2, a picture may be coded as a predictive picture (P-coded picture), an intra picture (I-coded picture), or a bi-predictive picture (B-coded picture). In H.264/AVC, pictures may be coded using a combination of multiple I, P, or B-slices. For example, in one possible arrangement, it is possible to code the top half of a picture as an I-slice and the bottom half as a P-slice. Some codecs support additional slice/picture types, for example SP and SI slices within H.264/AVC and multi-hypothesis pictures, and can also consider frame and field coding picture structures. Field and frame coded pictures of the same type tend to have very different coding characteristics. Frame coded pictures may be further subdivided at the macroblock level in frame or field macroblock coding structures if necessary. This can create a further differentiation between the coding statistics. Three primary coding types are available for compressing a picture: I-coded picture, P-coded picture, and B-coded picture, where it is assumed that such a picture consists of slices of the same type (I, P, or B respectively). An I-coded picture uses intra prediction from pixels of the same picture. A block in a P-coded picture can be additionally predicted using motion compensation from a previously encoded reference picture. It should be appreciated that the previously encoded reference picture does not have to be a past picture in display order, such as in MPEG-2 or MPEG-4 part 2, but rather can be a previously encoded reference picture in decoding order. Such a reference picture is not necessarily the same picture for each block in the current picture being encoded. For instance, "multiple reference prediction" allows the reference picture to be selected from a pool of candidate reference pictures. A B-coded picture can additionally use a combination of two motion-compensated predictions (MCPs) that are composed of blocks from multiple reference pictures. It should be appreciated that in the H.264/AVC video codec, the combined predictions can be originating from the same prediction direction, e.g., both from the past or both from the future or even from the same picture. In terms of the coding tools (e.g., coding modes such as intra or inter prediction) that are available to code a picture, an I-coded picture may be essentially considered a special case of a P-coded picture, and a P-coded picture may, in turn, be considered a special case of a B-coded picture. As well, I-, P-, and B-coded pictures have different coding statistics. For the same quantization parameter and content, I-coded pictures commonly use more bits than a P-coded picture, while, for image sequences with substantial temporal correlation, and depending on the coding configuration (e.g., the available references and their relationship with the current picture), B-coded pictures on average use fewer bits than P-coded pictures. Furthermore, it should be appreciated that pictures can be coded as a progressive frame or a pair of interlaced fields. Field coding may promote compression efficiency with video content that has been produced using an interlaced camera, as may be used in television production. For reasons of complexity or coding efficiency, it is also possible to code a picture using multiple slice types. An example of such a coded picture is shown in FIG. 20, which uses two B-slices, slice 1 (2002) and slice 2 (2004) and four P-slices, slice 0 (2006), slice 3 (2008), slice 4 (2010), and slice 5 (2012). Such coded pictures have different rate-distortion characteristics compared to a picture using only P-slices. Two basic unit configuration examples are shown in FIG. 22 and FIG. 23. In FIG. 22, a picture (2200) is coded using two slices, the first being a B-slice (2202) and the second a P-slice (2204). The B-slice (2202) is further subdivided into equal-sized raster-scanned basic units, basic unit 0 (2206), basic unit 1 (2208), basic unit 2 (2210), basic unit 3 (2212), and basic unit 4 (2214). The P-slice (2204) is sub-divided into two basic units, basic unit 5 (2216) and basic unit 6 (2218), which model an object and its background. In FIG. 23, an example configuration (2300) shows two basic units, basic unit 1 (2302) and basic unit 2 (2304), as groups of subsequent pictures.

Modern video codecs can use flexible prediction structures during encoding that adapt to the statistics of the sequence to maximize the quality of the compressed bit stream. In the context of H.264/AVC, it is possible to construct complex prediction structures known as "hierarchical coded pictures", such as those shown in FIG. 8-FIG. 11, which are described in further detail herein, below. Such structures may be significant to rate control because the rate-distortion performance of each slice type may be affected by the position of the prediction structure in the coding structure. For example, a B-coded picture at level 2 may likely have significantly different quality-bitrate trade-offs than a B-coded picture at level 1.

Figure 8:
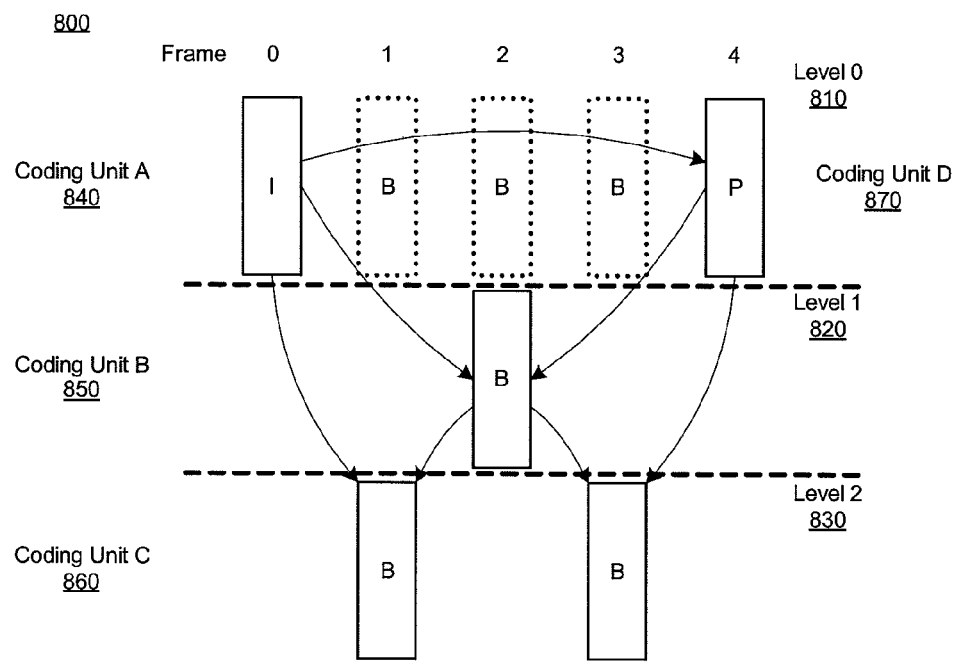
FIG. 8 is a schematic diagram showing a hierarchical binary decomposition structure with three temporal levels and four types of coding-units, according to an embodiment.

FIG. 8-FIG. 11 share some similarities. The following general discussion can be described with reference to FIG. 8. FIG. 8 is a schematic diagram showing a hierarchical binary decomposition structure (800) with three temporal levels and four types of coding-units. As used herein, the term "coding-unit" may refer to three types of information: the configuration of the coded picture (e.g., intra vs. inter coding, uni-prediction vs. bi-prediction, number of slices of the same type, number of rate control basic units, frame vs. field coding, single vs. multiple slices per picture and their arrangement, etc.), the position of the picture in the prediction structure, and the prediction relationships of the current picture in the prediction structure (e.g., the number, type, and position of its prediction references, among others), also referred to as the coding dependency. Put another way, the coding dependency of a particular picture identifies the pictures from which the particular picture is predicted. Hierarchical structures have different levels, the most basic one, in a sense, being a level 0 ("zero," 810). Pictures that belong to level 0 (810) have the highest priority and are used to decode pictures that belong to levels greater than 0. In general, to decode a picture at level l, pictures that belong to levels 0 through l-1 are decoded first. In previous coding standards, such as MPEG-2 and MPEG-4, after encoding picture n, there are two options: either predict and encode picture n+1, or predict and encode picture n+m, where m>1. Then pictures n and n+m are used as reference pictures for bi-prediction of pictures n+1 through n+m−1. It should be appreciated that pictures n and n+m are decoded prior to decoding pictures n+1 through n+m−1. Furthermore, pictures n and n+m can be decoded independently of pictures n+1 through n+m−1. Hence, in this embodiment, pictures n and n+m have a higher priority level, level 0, while pictures n+1 through n+m−1 are in the lower level 1. As well, each picture of pictures n+1 through n+m−1 can be decoded independently of each other. However, in the H.264/AVC codec, more complex and even arbitrary coding structures could be used. As an example one may select to consider more complicated dependencies within the m−1 internal hierarchical pictures. The value of m can also vary from one section of the encoded sequence to another, or one may encode pictures using a reverse/arbitrary coding order. Pictures at level 0 (810) are sometimes referred to as "anchor" pictures.

Figure 9:
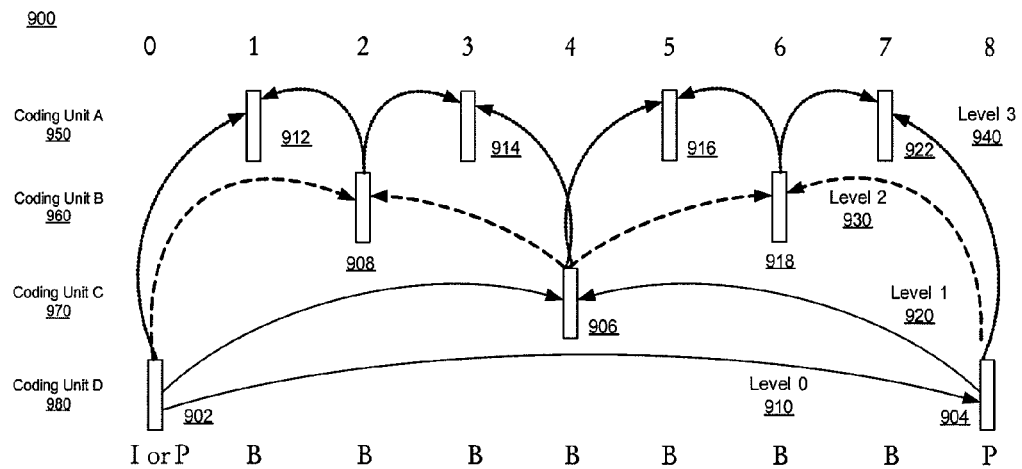
FIG. 9 is a schematic diagram illustrating a binary decomposition structure with four temporal levels and four types of coding-units, according to an embodiment.
Figure 10:
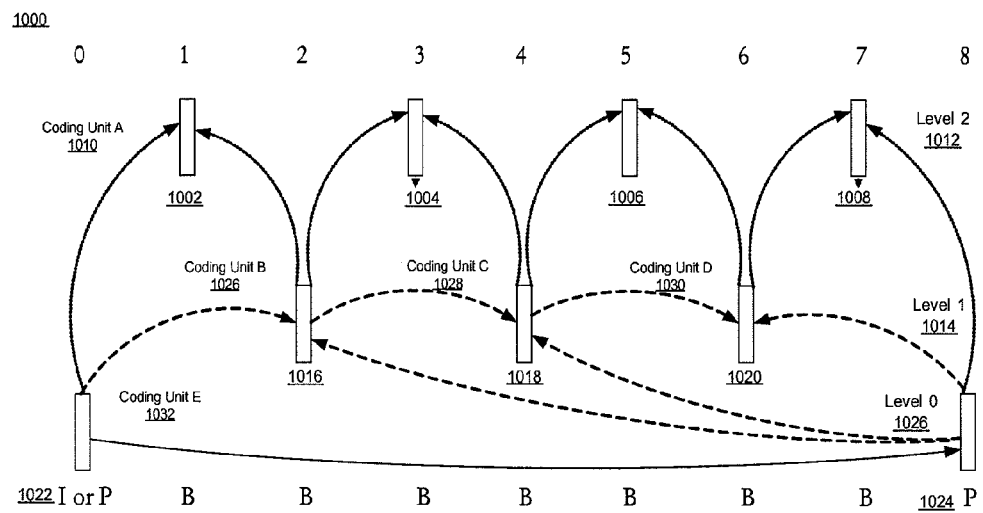
FIG. 10 is a schematic diagram illustrating a non-binary arbitrary decomposition structure with three temporal levels and five types of coding-units, according to an embodiment.

An example hierarchical structure can be described with reference to FIG. 9, a schematic diagram showing a binary decomposition structure (900) with four temporal levels and four types of coding-units. After picture 0 (902) has been coded, the encoder predicts and codes picture 8 (904). Picture 8 can be predicted and encoded using an I-coded picture or a P-coded picture (902 as shown) or a B-coded picture using as references previously coded pictures (not shown). Next, picture 4 (906) can be coded as a B-coded picture using as references pictures 0 and 8 (902, 904). Picture 4 (906) has lower priority than pictures 0 and 8 (902, 904) and therefore belongs to a different level, e.g., level 1 (920). Picture 2 (908) can now be coded as a B-coded picture using as references pictures 0, 4, and, optionally, 8 (902, 906, 940), which are the temporally closest pictures. Even though in the majority of the following descriptions one reference picture for each reference list is employed, when the decoded picture buffer is large enough, then more pictures may be used as reference candidates for each reference list, as long as they are coded before the current picture and are retained as references. Assuming no reference reordering and the use of only a single reference per list, then one reference list (list 0) would contain only picture 0 and the other one (list 1) would contain picture 4. If up to three references were allowed per list, then the default generated list 0 would contain pictures 0, 4, and 8, while the default list 1 would contain pictures 4, 8, and 0, in that order. The order may be significant as pictures with small indices take fewer bits to index. It should be appreciated that temporal prediction distance may have a direct effect on compression performance: the closer the reference is to the predicted picture, the higher the correlation, and the lower the prediction residuals. Picture 2 (908) has lower priority than picture 4 and 0 (906, 902) because picture 2 (908) belongs to a different level, level 2 (930). It should further be appreciated that, in another departure from traditional video coding (e.g., MPEG-2), any coded picture can be retained and used as a reference, including B-coded pictures. Similarly, any picture could also be signaled as non reference, including I and P-coded pictures. In this embodiment, picture 4 (907) is buffered as a reference picture. Otherwise picture 2 (908) may be predicted from the distant picture 8 (904), possibly affecting compression performance. Predicting a picture from a closer reference picture may promote compression performance. Picture 2 (908) is thus also buffered as a reference picture and used in conjunction with picture 0 (902) for bi-prediction of picture 1 (912). Then, picture 3 (914) is coded using as references pictures 2 and 4 (908, 906). Pictures 1 and 3 (912, 914) have lower priority than pictures 0, 2, and 4 (902, 908, 906) and belong to level 3 (940). The same process can be repeated for picture 5 (916), picture 6 (918), and picture 7 (922). While the above description discusses B-coded pictures, pictures 1 through 7 can be encoded with any available coding type within a particular codec, including multiple slices of I, P, or B type. Furthermore, pictures 1, 3, 5, 7 (912, 914, 916, 922) can be signaled as disposable pictures. Being signaled as disposable pictures may mean that such pictures are not used for motion-compensated prediction of other pictures. Not using or even not maintaining certain pictures for motion-compensated prediction may save memory and may provide temporal scalability.

Figure 11:
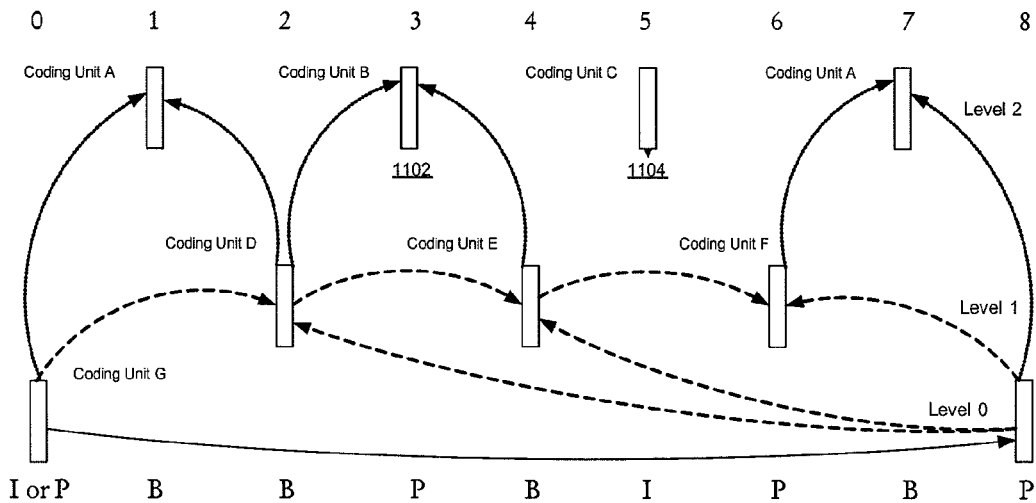
FIG. 11 is a schematic diagram illustrating a non-binary decomposition structure with three temporal levels and seven types of coding-units, according to an embodiment.

FIG. 8-FIG. 11 show that a coding-unit may comprise more than simply a combination of coding type (e.g., P-coded picture) and temporal level (e.g., level 1.) For instance, a coding-unit may also comprise a function of coding dependencies, e.g., the pictures from which the coding-unit is predicted. An example can be described with reference to FIG. 10, a schematic diagram showing a non-binary arbitrary decomposition structure (1000) with three temporal levels and five types of coding-units. Pictures 1 (1002), 3 (1004), 5 (1006), and 7 (1008) are coded as Coding-Unit A (1010), because pictures 1 (1002), 3 (1004), 5 (1006), and 7 (1008) are B-coded pictures and are predicted from neighboring pictures. For instance, each of pictures 1 (1002), 3 (1004), 5 (1006), and 7 (1008) is one picture apart in display order from the picture being coded. As well, each of pictures 1 (1002), 3 (1004), 5 (1006), and 7 (1008) belong to level 2 (1012). It should be appreciated that at level 1 (1014), the situation may differ. For instance, although the three pictures 2 (1016), 4 (1018), and 6 (1020) are coded as B-coded pictures, the coding dependencies of pictures 2 (1016), 4 (1018), and 6 (1020) may differ from the coding dependencies of pictures 1 (1002), 3 (1004), 5 (1006), and 7 (1008), perhaps significantly. For instance, picture 2 (1016) is predicted from one reference that is two pictures apart, picture 0 (1022) and another picture, picture 8 (1024) that is six pictures apart. Picture 4 (1018) is predicted from one reference that is two pictures apart, picture 2 (1016) and another reference that is four pictures apart, picture 8 (1024). Further, picture 6 (1020) is predicted from two references that are both two pictures apart, e.g., picture 4 (1018) and picture 8 (1014). It should be appreciated that the frame (or picture) distances described above relate to display order. The implication is that the coding statistics are altered. For instance, these pictures are assumed to be coded by different coding-units, coding-unit B (1026), coding-unit C (1028) and coding-unit D (1030). The edge P-coded pictures 0 and 9 (1022, 1024) belong to another coding-unit type, coding-unit E (1032). To further illustrate the effect of coding dependencies, a more complex situation is described with reference to FIG. 11. FIG. 11 is a schematic diagram showing a non-binary decomposition structure (1100) with three temporal levels and seven types of coding-units. Picture 3 (1102) is coded as a P-coded picture and hence has different coding statistics compared to the rest of the level 2 pictures. Picture 5 (1104) is coded as an I-coded picture yielding an additional coding-unit type.

Practical video sequences can be encoded using a combination of two or more coding-unit types. A rate control model maintains parametric models of the picture complexity and of the relationship of the quantization parameters to the number of bits. Such parametric models may be updated using the statistics from previously encoded coding-units. The parameters of these models can take very different values in the case of different coding-unit types. For example, the complexity and bits statistics for intra prediction may differ, perhaps significantly, from the complexity and bits statistics for inter-based uni-prediction and bi-prediction. Practically, the quantization parameter for encoding a picture with a given number of bits using intra instead of inter prediction can vary, perhaps significantly. Thus, using particular models for encoding each of the various coding-unit types may help in satisfying related constraints on rate control.

In an embodiment, rate control is applied by varying the QP that is used to encode a basic unit, where a basic unit is a collection of macroblocks. A macroblock is a fundamental unit comprising of a m×n block (e.g., 16×16) of pixel values. Each pixel can be associated with both luma and chroma information, if available, depending also on the sampling format (e.g., 4:4:4, 4:2:2, 4:2:0, or 4:0:0). In this scheme, the rate control basic unit can be as large as a picture and as small as a single macroblock. The steps of such rate control algorithm include:

1. A bit target is computed for a current picture.
2. If the current picture is divided into multiple basic units, the remaining bits are allocated equally to all non-coded basic units in the current picture.
3. The SAD prediction error of the current basic unit in the current picture is predicted as a linear function (model) of the SAD of the basic unit in the co-located position of a previous picture.
4. The corresponding quantization parameter is computed with the help of a quadratic rate-distortion model that is parameterized with respect to the SAD and the number of header bits.
5. The current basic unit is encoded with the quantization parameter derived from step 4.

Step 1 involves computing the bit target value for the current picture. Step 1 is also known as rate allocation. In an embodiment, the bit target is the sum of the bit rate over the frame rate (the bits per picture) plus a term that is a function of the difference between the current buffer fullness minus the target buffer level. In this embodiment, the bit target takes into account the buffer state. It should be appreciated that buffer fullness that exceeds the target buffer level leads to a reduced bit target and buffer fullness that is less than the target buffer level leads to an increased bit target. The bit target can be further improved by taking into account the coding-unit type used to encode the picture and the total remaining number of bits available at the given instance. Other useful factors include the remaining number of pictures of each coding-unit type that need to be coded, as well as complexity estimates of such coding-unit types. The above target rate computation is performed for P-coded pictures. No handling of I-coded pictures or B-coded pictures is performed. Such I- and B-coded pictures are encoded with heuristic quantization parameters that are functions of the QP values of neighboring P-coded pictures.

In Step 3, the resulting bit target value is translated into meaningful information that the encoder can use during encoding, e.g., a QP value. The SAD of the current basic unit in the current picture is predicted by the linear model of the SAD of the basic unit in the co-located position of a previously coded picture, using an equation of the form:

$$MAD_{curr} = \alpha_1 \times MAD_{prev} + \alpha_2 \qquad (1)$$

In (1) $SAD_{curr}$ represents the estimate of the current SAD, $SAD_{prev}$ is the previous SAD, and $\alpha_1$ and $\alpha_2$ are the linear model parameters that are estimated. The estimation statistics technique of the linear model parameters use linear regression on gathered from previously coded pictures. The quantization parameter is then computed with the quadratic rate-distortion model in Step 0 as:

$$T(j) = c_1 \times \frac{SAD_{curr}}{Q_{step}(j)} + c_2 \times \frac{SAD_{curr}^2}{Q_{step}^2(j)} - b_{header}(j) \qquad (2)$$

Term $b_{header}(j)$ is an estimate of the number of header bits used to encode P-coded pictures. T(j) is the target bit rate for picture j. Parameters $c_1$ and $c_2$ are estimated using a linear regression on past picture encoding statistics. Equation (2) is then solved to yield the quantization step size $Q_{step}(j)$, which is then used to derive the quantization parameter, as they share an one-to-one relationship.

It should be appreciated that some of the rate control algorithms discussed previously avoided applying the existing rate control model that modeled P-coded pictures on I- and B-coded pictures. For instance, only a single rate control model is maintained. The quantization parameters allocated to I- and B-coded pictures are heuristic functions of the values allocated to neighboring P-coded pictures. Such heuristic functions may not need to consider buffer status and bit rate. Encoding I- and B-coded pictures may thus lead to buffer overflows or underflows. Buffer overflows or underflows may be avoided with different rate control models for each coding-unit type. Memory and computational complexity may increase, however.

2.0 Overview of Rate Control Model Adaptation Based on Slice Dependencies for Video Coding Techniques are provided that determine the statistical parameters necessary for estimating the quantization parameters of a given coding-unit type (e.g., B- or I-coded picture) using information from other, not necessarily of the same type, previously coded coding-units (e.g., P-coded picture.) Certain techniques use the bit rate and quality relationships between such coding-unit types as well as the quantization parameters used for encoding such coding-unit types. The estimation of bit rate and quality relationships between coding-unit types enables accurate rate control regardless of the coding-unit type used for coding a picture. Furthermore, such bit rate and quality relationships between coding-unit types can be used jointly with multiple rate control models for increased compression performance. Rate control parameters are further optimized through the use of statistics that are generated by a motion estimation and compensation framework (MEMC), discussed in further detail herein, below.

It should be appreciated that novel approaches discussed herein may exhibit:
(a) Low memory complexity;
(b) Low computational complexity;
(c) Accurate rate control; and
(d) Faster rate control model convergence and initialization.

It should be appreciated that items (a) and (b) may lead to reduced power usage and items (c) and (d) may improve the quality of the compressed bit stream.

An embodiment can be applied to any rate control technique that relies on estimating quality/distortion, complexity, and bit rate to apply rate control. Two such rate control techniques are the quadratic model and the rho-domain model.

In an embodiment, a picture in the image sequence can be coded using a variety of available picture coding types. Furthermore, the quality-bit rate trade-off of a picture coding type is affected by its coding structure (e.g., intra vs. inter coding, uni-prediction vs. bi-prediction, number and types of slices or basic units, frame vs. field coding, single vs. multiple slices per picture, etc), and its position in the motion compensated prediction (MCP) structure. It should be appreciated that a basic unit can be smaller than a slice but can also be defined to comprise multiple pictures. This allows the flexibility of ensuring, e.g., constant quality or bit rate among picture groups. A picture coding type and structure position may be referred to herein as a coding-unit. In an embodiment, to apply rate control to a video bit stream, different rate control models are maintained for each coding-unit in order to accurately model the coding statistics of each coding-unit type. This may however increase memory complexity, as additional computations may be used to update the maintained rate control models. For example, assume a prediction structure involves a number N of coding-unit types. To perform efficient rate control, N rate control models are maintained, applied, and updated using coding statistics. In an embodiment, a number M of rate control models, where M<N, are maintained, applied, and updated. N−M missing rate control models are approximated using quality and bit rate ratios gathered from coded pictures that were coded using the N coding-unit types. Other statistics can improve the approximation of the missing N−M models. Such statistics include content-related statistics such as spatial variance, motion, and texture, among others. In an embodiment, the statistics gathered are used, not only to approximate the N−M missing models, but also to update the M models. The memory and computational complexity for approximating the N−M missing models may reflect savings, perhaps significant, over the complexity that may stem from maintaining and updating N−M real models. It should be appreciated that complexity may not only be related to the N−M models but to the M models. In an embodiment, it is the relative savings in complexity that are taken into account. As well, an embodiment also addresses the highly practical case of varying the number of coding-unit types in an image sequence due to changes in the prediction structure, in order to better code the image sequence.

Apart from statistics gathered during encoding and used to derive bit rate and quality relationships between pictures of different coding-unit types, an embodiment additionally utilizes statistics gathered by a spatio-temporal motion estimation and compensation framework (MEMC). Such MEMC uses information from past and possibly future pictures. Furthermore, in an embodiment, an encoder can gather statistics in an initial run and use the gathered statistics or refine the gathered statistics in subsequent runs to derive the rate optimally among the pictures. In an embodiment, the MEMC framework predicts each picture using a linear combination of blocks that originate from past and future pictures. As used herein, a block may refer to an n×n (e.g., 8×8) array of pixel values or, alternatively, discrete cosine transform (DCT), modified DCT (mDCT) or other Fourier-like transform values encapsulating chroma and luma information. It should be noted that blocks do not have to be of square size, e.g., they can be of size 16×8, 8×4, or 4×8. Combinations of blocks with different size, e.g., 16×16 and 8×8, could also be considered within the same coding unit. The prediction compensates for translational (or other) motion and illumination changes on a block level. The MEMC framework can optionally gather information on source picture variance, luma and chroma, texture, and edge information. Such information is processed internally and can be used in estimating the complexity of future pictures so that bit allocation can be optimized.

In an embodiment, a particular arrangement is used to improve the quality of the compressed video. For example, the rate control method described above in the General Overview section, in relation to the 5-step rate control algorithm comprising varying the QP, is used to obtain bit rate and quality statistics for different types of coding-units of compressed image sequences. In this embodiment, additional rate control models may be used for other coding-unit types, essentially disregarding the impact on complexity. The use of additional models allows accurate rate control, which may reduce latency. To achieve high compression efficiency (e.g., maximize visual quality for the same number of bits), apart from selecting good coding parameters, a proportion of the total bit rate that is allocated to each coding-unit type is carefully selected. Such bit rate and quality statistics gathered are used to derive an optimal rate allocation, which may then be used by the rate control models to improve visual quality for a given target bit rate. Rate control model initialization and convergence may thus be accelerated, which may improve image quality or consistency.

In an embodiment, the techniques discussed herein, above are applied in transcoding an initial video bit stream to a final video bit stream. Reasons for transcoding can include deriving a new bit stream that adheres to different (sometimes lower) buffering and bandwidth usage compared to the original bit stream, change in resolution or/and frame rate, availability of coding tools within a certain environment, etc. In an embodiment, bit rate and quality relationships of the original pictures are computed and applied to the rate control of the newly created bit stream, which may improve image quality and reduce complexity.

It should be appreciated that in an embodiment there are three kinds of parameters: (a) rate control model parameters that define each rate control model and its behavior (coefficients of QP linear or quadratic models, average header bits, etc.), (b) coding parameters that result by applying some rate control model and bit or quality constraints (e.g. the QPs), and (c) translation or scaling parameters that translate either (i) coding parameters from one coding unit to another or (ii) rate control model parameters that correspond to one coding-unit to another.

An embodiment has components that include:
(a) a video encoder;
(b) optionally, a motion estimation and compensation framework (MEMC);
(c) optional spatial statistics analysis modules;
(d) one or multiple rate control modules that maintain model status and make decisions;
(e) multiple statistics modules that gather useful statistics from the encoding process;
(f) an optional statistics module that gathers statistics from the motion estimation and compensation framework; and
(g) decision modules that fuse statistics from the optional MEMC pre-processor, if available, and the video encoder and provide feedback to the rate control modules.

An embodiment has components that include:
(a) a video transcoder;
(b) optionally, a motion estimation and compensation framework;
(c) optional spatial statistics analysis modules;
(d) one or multiple rate control modules that maintain model status and make decisions;
(e) multiple statistics modules that gather useful statistics from the encoding process;
(f) an optional statistics module that gathers statistics from the motion estimation and compensation framework; and
(g) decision modules that fuse statistics from the optional MEMC pre-processor, if available, and the video transcoder and provide feedback to the rate control modules.

Embodiments described herein include:
1. A first technique (described below in section 2.0.1 AN EXAMPLE FIRST TECHNIQUE—RATE CONTROL MODELING) allows accurate rate control for sequences that are encoded with different coding-unit types, without maintaining separate rate control models for all coding-unit types. Such a technique may be facilitated by gathering statistics from the video encoder and a motion-compensated temporal filter (MCTF) pre-processor.
2. A second technique (described below in section 2.0.2 AN EXAMPLE SECOND TECHNIQUE—GATHERING STATISTICS) gathers statistics from, optionally, a motion estimation and compensation framework or the first or subsequent passes of a multiple-pass video coder and uses the statistics to improve existing rate control methods, enhancing the picture complexity estimation, and assisting in the detection of scene types, such as fades, that can help optimize rate allocation. It should be appreciated that algorithms described herein, below for such a second technique can be used to enhance the first technique as well.
3. A third technique (described below in section 2.0.3 AN EXAMPLE THIRD TECHNIQUE—BIT ALLOCATION) uses the statistics generated by the first technique to allocate optimally the bits in conjunction with multiple rate control models, one for each coding-unit type. Such technique can achieve good compression efficiency while maintaining accurate rate control.
4. A fourth technique (described below in section 2.0.4 AN EXAMPLE FOURTH TECHNIQUE—TRANSCODING) uses principles from the three previous techniques (in sections 2.0.1, 2.0.2, and 2.0.3) to apply efficient rate control during transcoding.

2.0.1 An Example First Technique—Rate Control Modeling

An embodiment provides efficient and low complexity rate control when compressing image sequences that use motion-compensated prediction structures with complex and multiple coding dependencies, such as shown in FIG. 8-FIG. 11, described hereinabove. Complex structures such as those depicted in FIG. 8-FIG. 11 may comprise several types of coding-units. Such complexity may affect the practicality of maintaining distinct rate control models for each coding-unit type. For N coding-unit types, M rate control models, corresponding to the same number, M, coding-unit types of the N coding-unit types, are maintained. For the remaining N–M coding-unit types, corresponding rate control models are approximated using statistics gathered from coding the N coding-unit types. Initially, an arbitrary model is employed to derive coding parameters that control bit rate usage (e.g., QP, Lagrangian thresholding parameters, etc.). First, the arbitrary model is updated using statistics of a specific coding-unit type and then, using the bit target T(j) as input, determine the coding parameter that controls bit rate usage. An embodiment translates a rate control model derived from and corresponding to at least one of the M coding-unit types to a rate control model that corresponds to one of the N–M coding-unit types. Such translation involves modifying vital rate control parameters, such as bit target T(j), complexity estimate (e.g., SAD), and estimate of the header bits $b_{header}(j)$.

In an embodiment, the translation is facilitated by gathering a host of spatio-temporal statistics at the video encoder and/or an MEMC framework. Such gathered statistics may include, but are not limited to:

(a) the prediction error (e.g., SAD) between a current block and a prediction block using either motion-compensated prediction or intra prediction at the video encoder;

(b) the prediction error (e.g., SAD) between the current block and the prediction block using a linear combination of multiple motion-compensated predictions at the MEMC framework;

(c) the variance of the luma and/or chroma components of the source signal;

(d) the total number of bits used to encode the current basic unit (or picture);

(e) the number of bits spent to encode the texture for the current basic unit (or picture);

(f) the number of bits spent to encode the header and syntax information for the current basic unit;

(g) the motion parameters (e.g., translational, affine, or some higher-order model) and statistics, such as the first and second moments, that may be computed from said parameters;

(h) the weighting coefficients for the basic unit that are derived by using weighted prediction to derive a prediction block for the current block; and (i) the coding-unit type.

Figure 12:
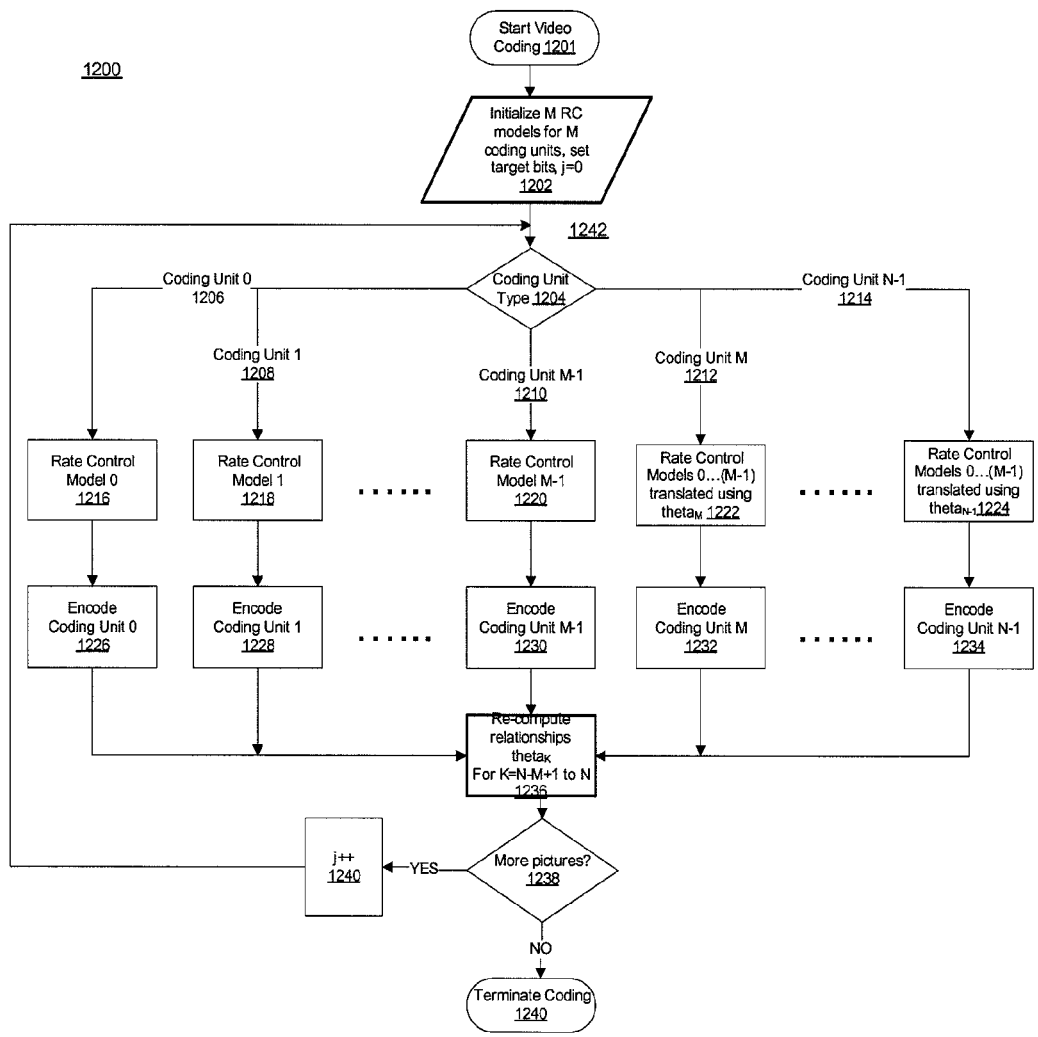
FIG. 12 is a flow diagram illustrating encoding using translation of rate control models, according to an embodiment.

An embodiment may be described with reference to FIG. 12, a flow diagram illustrating encoding using translated rate control models (1200). The process of FIG. 12 may include the following steps:

1. (1202) A video encoder is initialized. The video encoder uses a number N of coding-unit types to encode input pictures. A number M of rate control models are created, initialized, and buffered. The current picture index j is initialized to 0.

2. (1242) If this is the first picture in the image sequence then it is coded with coding parameters (e.g., QP) that are either specific or determined iteratively to satisfy the rate constraints. If the coding-unit type corresponds to one of the M buffered rate control models, then the corresponding rate control model, to which the image belongs, is updated and statistics, which include the number of spent bits, are buffered in a statistics buffer reserved for that coding-unit type. For all coding-unit types, the coding data are normalized to the same coding parameters (e.g., QP.)

3. If this is not the first picture, then the coding-unit type is checked (1204).

(a) If the picture is the first picture of that particular coding-unit type in the sequence, then use an initial set of coding-unit parameter (e.g., QP) to encode it. These coding parameters could be arbitrarily selected, estimated given some preliminary, basic or thorough information about the coding-unit, or iteratively selected. Alternatively, use information gathered at Step 2 above to estimate the coding parameters for the current coding-unit. In an embodiment, while exact relationships between pictures have not yet been determined, such relationships are initialized with values that represent the behavior of an average video sequence. For example, information reflecting that P-coded pictures are subsets of B-coded pictures is used to adapt QP accordingly for B-coded pictures. In this case, QP is for example increased. For instance, relationships between pictures are combined with the statistics gathered by coding or analyzing the first picture of the video sequence to yield a good initial QP for this picture. If the coding-unit type corresponds to one of the M buffered models, then the rate control model corresponding to the coding-unit, to which the image belongs, is updated. Regardless of the coding-unit type, a host of statistics, which include the number of spent bits and the resulting distortion after encoding, are buffered in a statistics buffer associated with that coding-unit type.

(b) Otherwise, the encoder determines whether the coding-unit type corresponds to one of the buffered M models or one of the N–M missing models (1204). In the first case, where the coding-unit type corresponds to one of the buffered M models (1206, 1208, 1210), the appropriate existing model is selected to provide the coding parameters for the current picture (1216, 1218, 1220). The current picture (or slice) is encoded (1226, 1228, 1230). Then the rate control model corresponding to the coding-unit, to which the image belongs, is updated. In the latter case, the coding-unit type corresponds to one of the N–M missing models (1212 and 1214), the data gathered in the statistics buffers for each coding-unit type are processed to yield a translation (1222, 1224). Such translation converts coding parameters, such as the bit target T(j) and the estimate of the header bits $b_{header}(j)$), from one (or a combination thereof) of the buffered M models to coding parameters suitable to be used with the N–M coding-unit types (1222, 1224). The resulting coding parameters are used to encode the picture (1232, 1234). The various coding-unit types buffer a host of statistics, which include the number of spent bits, in a statistics buffer associated with that coding-unit type.

4. After encoding the current picture, the data in the statistics buffers are processed to capture the most recent image statistics.

5. The encoder determines whether there are more pictures to code (1238). If yes, the current picture index j is incremented (1240), and control proceeds to step 2. Otherwise coding may be terminated.

Figure 2:
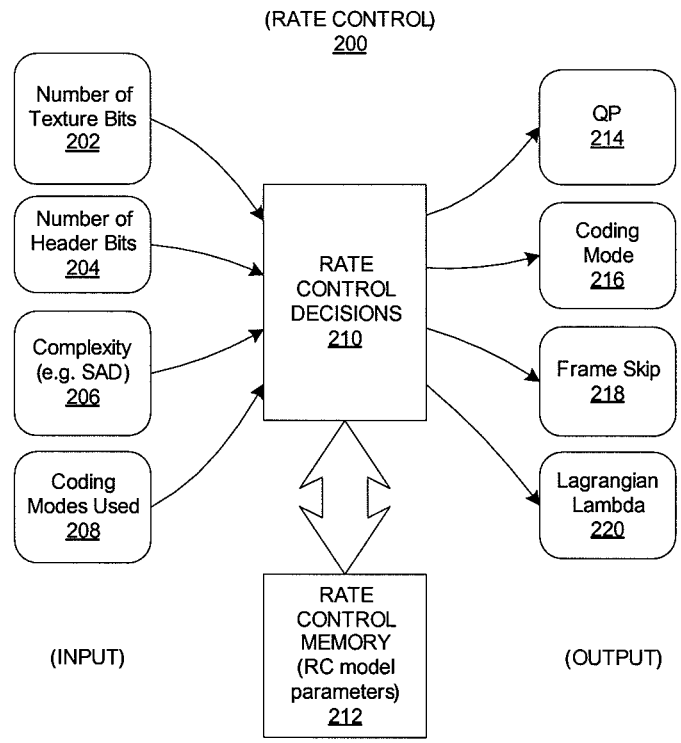
FIG. 2 is a schematic diagram illustrating a generic rate control model, according to an embodiment.

Referring to FIG. 2, an embodiment uses a rate control model (200). For example, a rho-domain rate control algorithm can be used as the rate control model. A rate control decisions module (210) takes as input the number of target bits, such as the number of texture bits (202) and the number of header bits (204), an estimate or estimates of the complexity of the picture, e.g., SAD (206) and coding modes used (208). Rate control decisions module (210) outputs coding parameters, such as QP (214), coding mode (216), frame skip (218), and the Lagrangian parameter λ (220) among others. As well, such output coding parameters (also referred to as rate control model parameters) are stored in rate control memory (212). In an embodiment, when multiple coding parameters (e.g., QPs) are used to code a picture, the output coding parameter can be computed as the arithmetic mean (average), the weighted average, the median value, or a non-linear combination of such multiple (granular) coding parameters. In another embodiment, if the encoder used multiple coding units to encode a single picture with multiple slices, the output coding parameter can be computed as the arithmetic mean (average), the weighted average, the median value, or a non-linear combination, of such multiple (granular) coding parameters among others.

In an embodiment of video coders, the prediction structure and therefore the coding-units are adapted at regular or irregular intervals to obtain a better match with the underlying statistics of the video sequence. The number and the type of coding units may change, which may thus affect the maintained rate control models and the coding-unit translations. Two example cases are described as follows:

(a) New coding-units without any maintained models or statistics. In this case, the rate control models (buffered or approximated) of the new coding-units are initialized by translating previously maintained rate control models to the new ones. The translation also uses specific relationships (e.g., a B-coded picture may use, given a QP, on average, fewer bits than a P-coded picture). It should be appreciated that algorithms that can be applied for these translations are described in further detail in section 2.0.2, "AN EXAMPLE SECOND TECHNIQUE—GATHERING STATISTICS," herein, below.

(b) Coding-units of a new structure that were also present in a previous structure. In this case, the previously gathered statistics and rate control models are adapted for use in the new structure.

In an embodiment, the coding type of the current picture is identified. For example, the coding type of the current picture is identified as an I-, P- or B-coded picture. If the current picture is a B-coded picture, and this picture is not an anchor picture (e.g., within level 0), then the hierarchical level l is determined as well. An example hierarchical B-coded picture structure with three hierarchical levels and a binary decomposition structure is depicted in FIG. 8. Depending on the maximum number of available hierarchical levels, one may control the temporal resolution of the decoded video sequence by adjusting the highest desired level to be decoded. For example, if only pictures belonging to temporal level 0 in FIG. 8 are decoded, a version of the image sequence at one fourth the temporal resolution may be rendered. If pictures belonging to levels 0 and 1 are decoded, the image sequence may be displayed at twice the resolution of level 0 alone (e.g., half the native resolution.) By decoding all temporal levels, the image sequence may be displayed at the native temporal resolution. As another example, let the number of coding unit types N=3 and the number of rate control models M=1 (P-coded pictures). If the encoder is coding the current picture using P-coded coding-units, then the existing rate control model can be used with the bit target of Equation 2. However, if the encoder encodes the current picture using I- or B-coded coding-units, the final bit target T(j) is scaled to account for deriving both the linear SAD model as well as the quadratic QP model described above from P-coded picture statistics. To scale for this inconsistency, scaling parameters $\theta^l_B$ and $\theta_I$ are introduced to derive the following rate allocation:

$$T_{final}(j) = \begin{cases} f^l_B(T(j)) = \dfrac{T(j)}{\theta^l_B} & \text{if } B\text{-}SLICE \\ f_I(T(j)) = \dfrac{T(j)}{\theta_I} & \text{if } I\text{-}SLICE \\ T(j) & \text{if } P\text{-}SLICE \end{cases} \quad (3)$$

In this embodiment, the rate control model relates to P-coded pictures. Scaling parameters $\theta_I$ for the I-coded pictures and $\theta^l_B$ for the B-coded pictures are estimated depending on the characteristics and temporal level l to which the I-coded pictures and the B-coded pictures belong. In an embodiment, the rate control model relates to the I-coded pictures and scaling parameters $\theta^l_B$ and $\theta_P$ for the B-coded and P-coded pictures, respectively, are estimated. It should be appreciated that functions $f^l_B(\ )$ and $f_I(\ )$ that scale the bit target T(j) to the P-coded picture rate control model target $T_{final}(j)$ can be any function of the video statistics.

In an embodiment, $N_{buffer}$ denotes the number of results buffered in statistics buffers as coding history. Prior to buffering the number of bits used to encode a picture, such numbers are normalized to the same quantization parameter value, $QP_{NORM}$. It should be appreciated that normalizing bits to a same quantization parameter value is integral, which may help yield bit rate ratios between different coding-units that are no longer dependent on the quantization parameter values. For example, assume b bits were used to encode a picture with an average picture QP value of $QP_{ave}$. Assume also that, for the case of H.264/AVC, the bits-to-QP factor is approximately $f_{QP}=1.125$. Then, the normalized bits value $b_{NORM}$ is computed as follows:

$$b_{NORM} = b \times (f_{QP})^{QP_{ave} - QP_{NORM}} \quad (4)$$

In other words, according to the embodiment above, if the average QP value is different from $QP_{NORM}$, then the bit number is normalized. Otherwise, the bit number remains unchanged.

Figure 13:
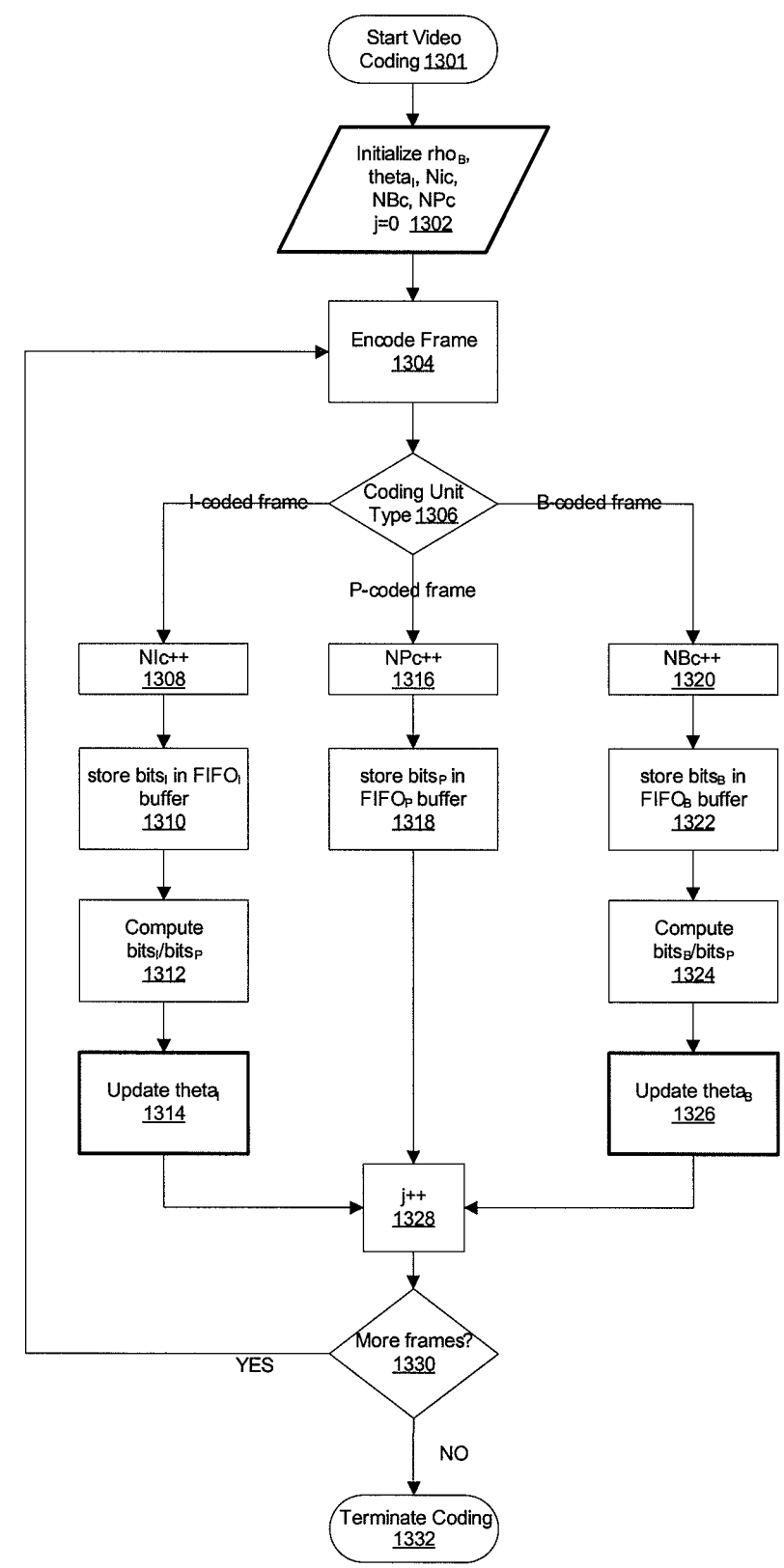
FIG. 13 is a flow diagram for estimating bit rate relationships of different types of coding-units, according to an embodiment.

Referring to FIG. 13, an embodiment for estimating bit rate relationships of different types of coding-units (1300) is illustrated. Let $Bits_I(i)$ and $Ratio_I(i)$ denote two statistics buffers of size $N_{buffer}$ that store (a) the normalized number of bits used to code an I-coded picture and (b) the ratio, used as a scaling parameter, of the normalized number of bits used to code the picture as intra over the normalized number of bits used to encode the picture as a P-coded picture. Similarly, let $Bits^l_B(i)$ and $Ratio^l_B(i)$ denote two statistics buffers of size $N_{buffer}$ that store the normalized number of bits used to code a picture as a B-coded picture and the ratio, used as a scaling parameter, of the normalized number of bits used to code the picture as a B-coded picture for given temporal level l over the normalized number of bits used to code the picture as a P-coded picture. Let $Bits^l_P(i)$ denote a statistics buffer of size $N_{buffer}$ that stores the normalized number of bits used as a parameter to code a P-coded picture. Still referring to FIG. 13, an embodiment for estimating bit rate relationships of different types of coding-units comprises the following steps:

1. (1302) Initialize bit rate scaling parameters $\theta^l_B$ and $\theta_I$ with user predefined values as $\theta^l_B(0)$ and $\theta_I(0)$. The parameters $N_{I,c}$, $N_{P,c}$, and $N^l_{B,c}$, are the numbers of encoded I-coded, P-coded, and B-coded pictures, respectively, at hierarchical level l, and are set to zero. The counter j of the picture being encoded is set to 0. Proceed to Step 3.

2. Determine coding-unit type (1306). If the current picture was encoded as an I-coded picture, proceed to Step 3. Otherwise, if the current picture was encoded as a P-coded picture, proceed to Step 4. Otherwise (B-coded picture), proceed to Step 5.

3. (1308) Increment the number of encoded I-coded pictures $N_{I,c}$ by one. Normalize the number of bits spent to code the current picture, for example as described in Equation 4, and store the number of bits spent to code the current picture in the I-coded picture bit statistics buffer (1310), as follows: $Bits_I(N_{I,c} \bmod N_{buffer})=b(j)$. Next, divide this number by the number of bits spent to code the last P-coded picture (1312), which is buffered in the P-coded picture bit statistics buffer, and store the result in the I-coded picture bit ratio statistics buffer, as follows:

$$Ratio_I(N_{I,c} \bmod N_{buffer}) = \frac{Bits_I(N_{I,c} \bmod N_{buffer})}{Bits_P(N_{P,c} \bmod N_{buffer})}.$$

Estimate scaling parameter $\theta_I$ for the I-coded pictures by calculating $\theta_I$ as the average of the stored bit ratios (1314):

$$\theta_I = \frac{\sum_{n=0}^{\min(N_{I,c},N_{buffer})} Ratio_I((N_{I,c}-n) \bmod N_{buffer})}{\min(N_{I,c}, N_{buffer})}.$$

Proceed to Step 6.

4. Increment the number of encoded P-coded pictures $N_{P,c}$ by one (1316). Normalize and store the number of bits spent to code the current picture in the P-coded picture bit statistics buffer as follows (1318): $Bits_P(N_{P,c} \bmod N_{buffer})=b(j)$. Proceed to Step 6.

5. The process is similar to that for the I-coded pictures in Step 2. For the given temporal level l, perform the following actions. Increment the number of encoded B-coded pictures $N_{B,c}^l$ by one (1320). Normalize and store the number of bits spent to code the current picture in the B-coded picture bit statistics buffer as follows (1322): $Bits_B^l(N_{B,c}^l \bmod N_{buffer})=b(j)$. Then divide this result by the number of bits spent to code the last P-coded picture (1324), which is buffered in the P-coded picture bit statistics buffer. Store the quotient in the B-coded picture bit ratio statistics buffer:

$$Ratio_B^l(N_{B,c}^l \bmod N_{buffer}) = \frac{Bits_B^l(N_{B,c}^l \bmod N_{buffer})}{Bits_P(N_{P,c} \bmod N_{buffer})}.$$

The scaling parameter $\theta_B^l$ for the B-coded pictures is estimated by calculating $\theta_B^l$ as the average of the stored bit ratios (1326):

$$\theta_B^l = \frac{\sum_{n=0}^{\min(N_{B,c}^l,N_{buffer})} Ratio_B^l((N_{B,c}^l-n) \bmod N_{buffer})}{\min(N_{B,c}^l, N_{buffer})}.$$

Proceed to Step 6.

6. Increment the counter j by one (1328) and encode the j-th picture. Determine whether there are more pictures to encode (1330). If not, terminate algorithm (1332). Otherwise, proceed to Step 2.

In a certain embodiment, SP-coded pictures are considered equivalent to P-coded pictures in the above derivation.

2.0.2 An Example Second Technique—Gathering Statistics

As described above, a first technique enables accurate rate control for multiple coding-unit types without the need to maintain and update rate control models for all possible types of coding-units in a video sequence. As described in this section, a second technique uses spatio-temporal statistics gathered from an MEMC framework and a spatial analyzer or a previous coding pass to improve rate control. Rate control algorithms, such as the hybrid linear/quadratic rate control algorithms may use a good estimate of the complexity of the current picture (e.g., the motion-compensated prediction error.) In an embodiment, a high performance solution is obtained by performing multiple-pass encoding of the picture. By performing multiple-pass encoding of the picture, the rate control model has access to the successively more accurate coding statistics at each coding pass. In an embodiment, motion estimation complexity for the current pass may be reduced by buffering, reusing, and refining the motion parameters derived during the previous coding pass.

Figure 7:
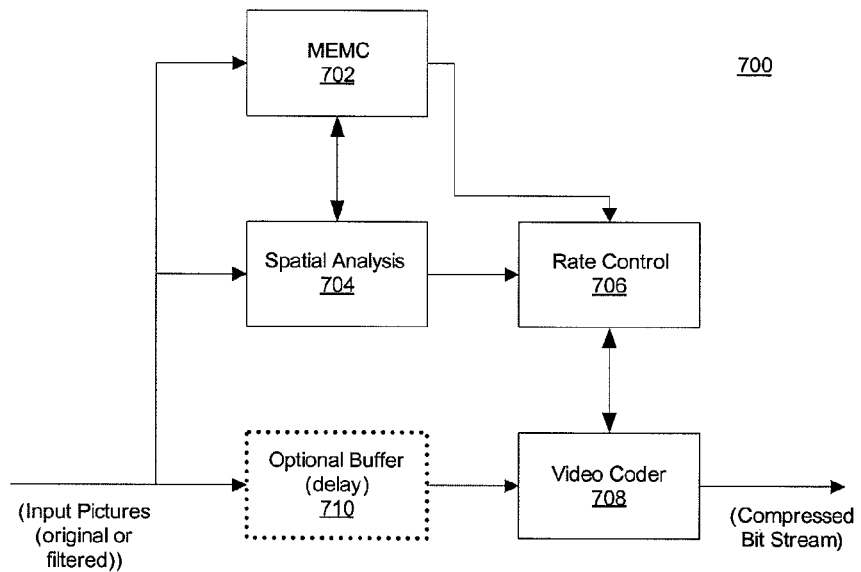
FIG. 7 is a schematic diagram illustrating a motion-compensated temporal filter used as a pre-analysis stage, according to an embodiment.

An embodiment improves rate control, as described with reference to FIG. 7. FIG. 7 is a schematic diagram illustrating a motion-compensated temporal filter used as a pre-analysis stage (700). Motion estimation and motion compensation framework (702) and spatial statistics analysis module (704) are used to generate input to rate control module (706) as shown in FIG. 7, which improves rate control. Also illustrated for completeness are the video coder (708) for generating the compressed bit stream and an optional buffer (710). Buffer 710 delays input pictures (original or filtered) for video coder (708). Spatial statistics analysis module (704) computes spatial statistics such as, for example:

(a) DC value (average) and the variance of the luma and chroma components;
(b) Frequency content (coefficients of DCT, mDCT, or wavelet transforms); and
(c) Edge information using tools such as Sobel filtering.

Figure 14:
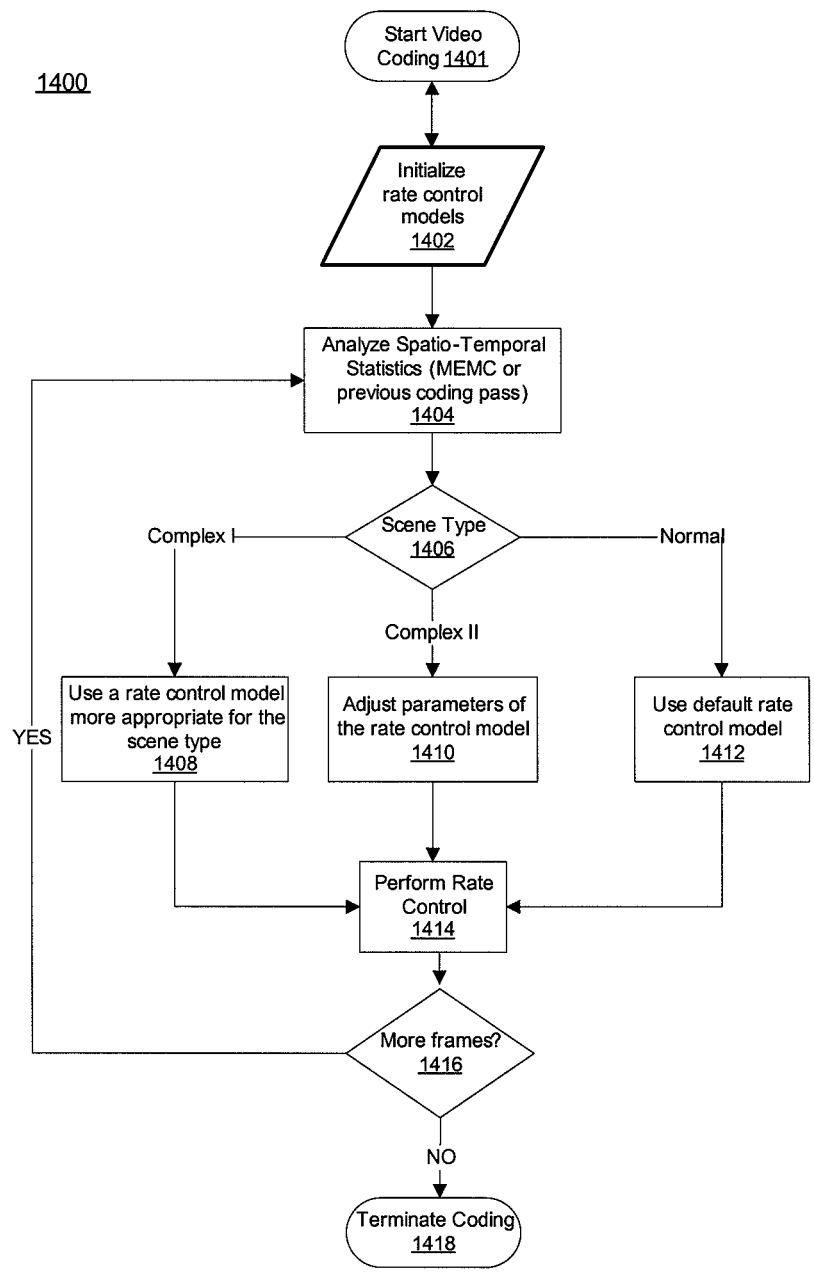
FIG. 14 is a flow diagram of an algorithm for improving rate control, according to an embodiment.

An embodiment can be described with reference to FIG. 14, a flow diagram illustrating an algorithm for improving rate control and optimizing rate allocation (1400). Rate control models are initialized (1402). Spatio-temporal statistics, derived from the MEMC framework or from a previous coding pass of a multiple-pass video coder, for each incoming coding-unit are analyzed (1404) to facilitate selecting the rate control model used to code the particular coding-unit. Such analyzed data are used to determine a particular scene type for such coding-unit (1406). When the scene type is a first complexity type, the encoder selects a rate control model that is more appropriate for such scene type (1408). When the scene type is a second complexity type, the encoder adjusts the parameters of a default rate control model (1410). When the scene type is a normal type, the encoder selects the default rate control model (1412). Upon selecting the rate control model for the particular coding-unit, the encoder performs rate control (1414). The encoder determines whether more coding-units exist in the input video (1416). If not, the coding terminates (1418). Otherwise, control returns to analyzing coding-units (1404).

Referring to FIG. 7, rate control module (706) receives information from MEMC framework (702) and spatial analysis module (704). It should be appreciated that such spatio-temporal analysis modules share information, which optimizes operations. In an embodiment, MEMC framework (702) performs uni-predictive and bi-predictive motion estimation and compensation, involving both past and, optionally, future pictures. As well, pictures can also be predicted from linear or non-linear combinations of motion-compensated predictions from multiple reference pictures.

Figure 5:
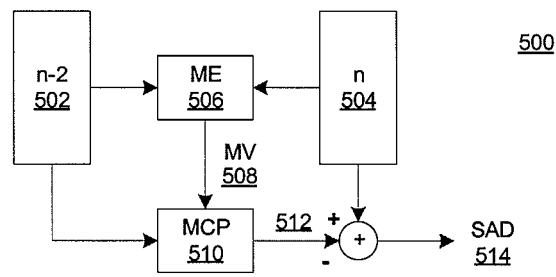
FIG. 5 is a schematic diagram illustrating SAD computations using a single preceding reference picture, according to an embodiment.
Figure 6:
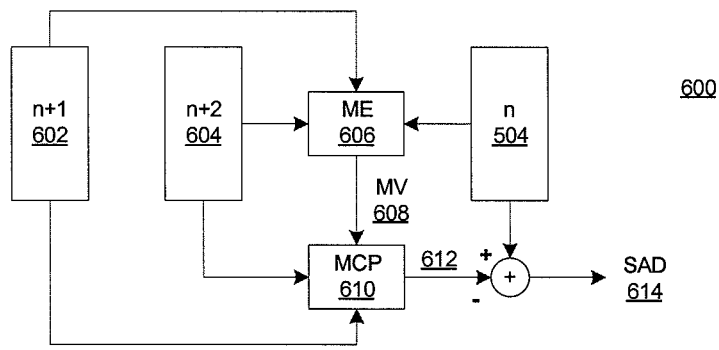
FIG. 6 is a schematic diagram illustrating SAD computations using multiple subsequent reference pictures, according to an embodiment.

In an embodiment, MEMC framework (702) computes the motion-compensated prediction error (e.g., SAD) between pictures as shown in FIG. 5 and FIG. 6. It should be appreciated that the prediction error can be computed using pictures in the past and the future. FIG. 5 uses a motion-compensated temporal filter (MCTF, 506, 508, 510) and one reference from the past 502. For example, FIG. 5 illustrates SAD computations 500 using a single preceding reference picture 502. A current picture 504 and preceding picture 502 are input into a motion estimation module 506. Motion estimation module 506 represents the movement of one or more blocks using a set of motion vectors 508, which are provided to a motion compensation module 510. Motion compensation module 510 applies motion vectors 508 to one or more blocks in preceding reference frame 502 to generate a prediction picture 512. Prediction picture 512 is a characterization of the image shown in current picture 504 based on motion vectors 508 and preceding reference picture 502. Error prediction module 514 determines the difference between prediction picture 512 and current picture 504 and expresses the difference as a mean absolute difference.

FIG. 6 uses an MCTF (606, 608, 610) and two references from the future 602 and 604. For instance, FIG. 6 illustrates SAD computations 600 using multiple subsequent reference pictures 602 and 604. A current picture 504, first subsequent reference picture 602, and a second subsequent reference picture 604 are input into a motion estimation module 606. Motion estimation module 606 represents the movement of one or more blocks using a set of motion vectors 608, which are provided to a motion compensation module 610. Motion compensation module 610 applies motion vectors 608 to blocks in first and second subsequent reference pictures 602, 604 to generate a prediction picture 612. Prediction picture 612 is a characterization of the image shown in current picture 504 based on motion vectors 608 and first and second subsequent reference pictures 602, 604. Error prediction module 614 determines the difference between prediction picture 612 and current picture 504 and expresses the difference as a mean absolute difference.

In an embodiment, motion estimation and compensation methodology uses weighted prediction. In another embodiment, motion-compensated prediction can be a single block in a different picture or a linear combination of blocks that belong to the same or different pictures at arbitrary points in the image sequence. It should be appreciated that the motion model that the MEMC framework (702) adopts can be any available model such as the translational, the affine, or parabolic motion models. The prediction error (e.g., the SAD) at the MEMC framework is then used by the encoder to more accurately estimate the current prediction error $SAD_{curr}$ at the video encoder. For example, a linear SAD model may be replaced with the following straightforward computation:

$$SAD_{curr} = SAD_{prev} \frac{SAD_{curr}^{MEMC}}{SAD_{prev}^{MEMC}}, \quad (5)$$

where the current encoder SAD value is estimated as the product of the SAD value $SAD_{curr}^{MEMC}$ for the prediction of the current picture using the MEMC framework times the previous encoder SAD value, divided by the SAD value $SAD_{prev}^{MEMC}$ for the prediction of the previous picture using the MEMC framework.

An embodiment uses spatial variance in place of prediction error (SAD). When complexity and delay constraints deter motion estimation and compensation, spatial variance may be useful. Hence, Equation 5 is generalized as:

$$err_{curr} = \text{func}(err_{prev}, \text{MEMC}, \text{spatial analyzer}) \quad (6)$$

For instance, prediction error is estimated as a function of the prediction error of the previously coded picture and statistics gathered by the MEMC framework and spatial-analyzer, which can include:
  (a) prediction error values from the motion-compensated framework;
  (b) translational motion-vector values;
  (c) weighted-prediction weights and offsets; and
  (d) motion parameters of higher-order motion models such as the affine or parabolic models.

In an embodiment, weighted prediction parameters, such as weights and offsets, are estimated by the MEMC framework. Such estimated values can be used to improve the estimation of the picture complexity at the video encoder. An example translational motion-compensated prediction is as follows:

$$\tilde{p}_n(i,j) = p_{n-r}(i+v_x, j+v_y) \quad (7)$$

Disregarding fractional-pixel motion-compensated prediction, pixels $p_n(i,j)$ of a block in picture n can be predicted as a displaced block in picture n–r, the starting top-left coordinates of which are shifted by $v_x$ pixels in the horizontal dimension and by $v_y$ pixels in the vertical dimension. Applying weighted prediction to (7) results in:

$$\tilde{p}_n(i,j) = w \times p_{n-r}(i+v_x, j+v_y) + o, \quad (8)$$

where w and o denote the weight and offset parameters of weighted prediction. For instance, motion-compensated prediction is multiplied by the weight and an offset is added.

It should be appreciated that motion compensation architectures of video encoders and the MEMC framework may differ. As well, prediction error values generated at the encoder and the MEMC framework may not be directly comparable. Such difference in prediction error values may occur for a variety of reasons, including different block sizes for block-based motion-compensated prediction, different motion models (e.g., affine, parabolic, translational, etc), different fast motion estimation algorithms, different weighted prediction parameter estimation algorithms, quantization distortion in the prediction reference, among others. An embodiment uses estimated motion model parameters at the MEMC framework to modify rate control parameters, accounting for limitations in the motion-compensated prediction of the video encoder. In an embodiment, rate control parameters are modified based on a divergence of (e.g., using a difference metric between) motion model parameters from the received information from the MEMC or coding statistics from the received information from the first or subsequent coding pass (e.g., previous pass of multiple-coding passes) and motion model parameters from the encoder. It should be appreciated that the motion model of the MEMC framework may be more complex and more accurate than a motion model executing in a particular video encoder.

An embodiment that functions with the state-of-the-art H.264/AVC video coding standard, uses the estimated weighted prediction offset to modify the estimate of the prediction error value. For example, when the encoder uses the H.264/AVC Baseline profile to encode a picture, the video encoder may only use I-coded and P-coded pictures. In another scenario, the encoder may avoid using B-coded pictures or weighted prediction to conserve computational resources and avoid possible syntax related constraints. While the translational motion model of Equation 7 can efficiently handle translational motion (e.g., horizontal and/or vertical movement, in a two dimensional framework), global illumination changes may strain the same translational model. Without weighted prediction, Equation 8 may not maximize coding efficiency, for example, with scene transitions that involve global or local illumination changes such as cross-fades, flashes, fade-ins, and fade-outs. In an embodiment, let SAD error for translational motion be e when the average luma of two blocks is the same. Assume that, beside translational motion, the illumination increases on average by dc. Then, when weighted prediction is unavailable, the prediction SAD error increases to approximately e+dc. It should be appreciated that offset o from Equation 8 can be employed to compensate for the global illumination change and reduce the error closer to e. Then, MEMC framework can estimate the offset value õ, which can then be fed to the SAD estimator to improve the estimate of the current SAD value. For instance , current SAD value is computed as:

$$SAD_{curr} = \alpha_1 \times SAD_{prev} + \alpha_2 + \tilde{o} \qquad (7)$$

Figure 3:
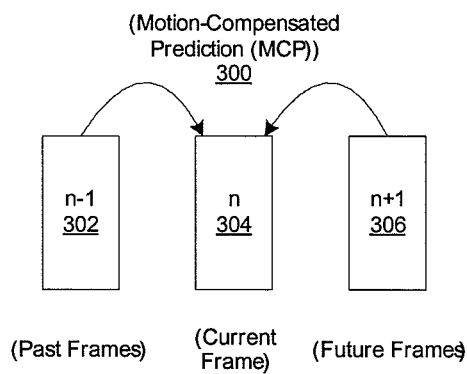
FIG. 3 is a schematic diagram illustrating prediction of a current picture using a weighted linear combination of blocks originating from neighboring pictures in the past and future, according to an embodiment.

In an embodiment, an MEMC framework may be used in different configurations for improving rate allocation and rate control. An embodiment can be described with reference to FIG. 3, a schematic diagram illustrating motion-compensated prediction (MCP) 300 of a current picture using a weighted linear combination of blocks originating from neighboring pictures in the past and future. The MEMC framework uses one past picture 302, picture n−1, and one future picture 306, picture n+1, as motion-compensated references to predict a current picture 304, n. It should be appreciated that while current picture 304 may be predicted from the past or the future, the complexity of the future picture 306, picture n+1, can also be predicted. According to an embodiment, distortion values resulting from prediction from the two references (302, 306), as well as the resulting motion vectors, are compared. Translational motion vectors, available for two references and pointing to the same pictures, are also amenable to further processing, which can yield affine motion vectors. Availability of affine motion vectors can enhance rate control. Multiple scenarios for picture n+1 are possible, including:

(a) picture n+1 is similar to picture n, which can be easily determined (e.g., low prediction distortion value.)

(b) picture n+1 is similar to picture n−1, which can be somewhat harder to determine. One way to determine this case is to compare the motion vectors originating from pictures n+1 and n−1. When such motion vectors with illumination considerations appear similar in magnitude and inverse in direction (e.g., are correlated), it may be inferred that those two references are similar and perhaps picture n represents a temporary occlusion (e.g., obstruction) or illumination change of some sort. Furthermore, global (picture-level) and local (block-level) average luma and chroma, source variance statistics, and one or more values reflecting other such complexity relationships between the two reference images (e.g., the sum of absolute difference of color histograms of the two reference images) gathered by the MEMC framework may aid the decision about whether picture n+1 is similar to picture n−1. Similarity between the SADs for each prediction reference can also indicate content similarity.

(c) When none of the above conditions are met, the SAD prediction error from n+1 to n may indicate whether the two pictures are similar or dissimilar.

Figure 4:
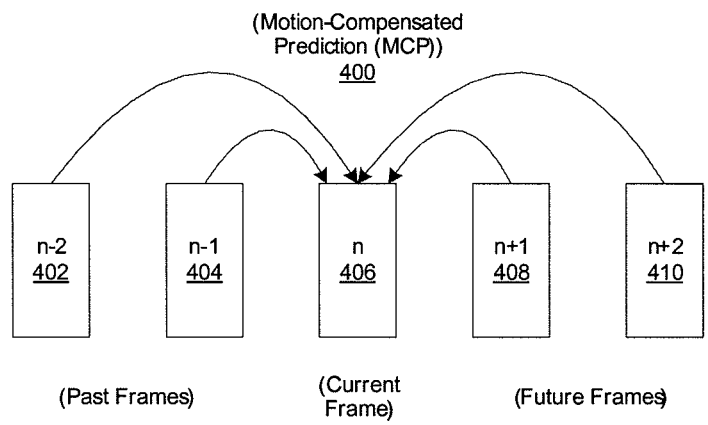
FIG. 4 is a schematic diagram illustrating motion-compensated prediction, according to an embodiment.

An embodiment can be described with reference to FIG. 4, a schematic diagram illustrating MCP 400. MCP 400 buffers future pictures, and may thus introduce some degree of latency. The current picture n 406 to be coded, is predicted from two reference pictures in each prediction direction, two from the past: pictures n−2 (402) and n−1 (404) and two pictures from the future: pictures n+1 (408) and n+2 (410). Four motion-compensated predictions may result in one to four prediction (e.g., SAD) errors. Information derived from such SAD errors can be useful in selecting among the rate control models and coding parameters for pictures n, n+1 and n+2. For example, assume the SAD from picture n+1 significantly exceeds the SAD from picture n+2. (Although, it should be appreciated that larger temporal prediction distances for MCP may yield larger SAD values.) Such difference in SADs may point to a change, which may be abrupt, such as an illumination change or object occlusion (obstruction) that affects picture n+1. At the same time, pictures n and n+2 may be correlated to each other. Correlation may be strengthened if pictures n−2 and n−1 are also well correlated to n. If pictures n−2 and n−1 are not well correlated to n, then pictures n and n+2 may perhaps be isolated flashes or temporary occlusions. More dependencies may be evaluated such as the prediction errors or motion between pictures n+1 and n−1 and the prediction errors or motion between pictures n+2 and n−1. These evaluations can better identify relationships between pictures. For example, with abrupt occlusions or flashes, prediction errors may be significant. However, the small duration of such abrupt occlusions or flashes coupled with temporal masking may conceal prediction errors. A higher bit rate may be allocated to preserve picture quality among these pictures. However, temporal masking may obviate increasing the bit rate to values that may be applied to obtain equivalent picture quality. Relationships between two pictures can be established even when none is a reference of the other and, optionally, in the case that neither share common references. This is possible where there are available statistics (e.g., from an MEMC module, a prior coding pass, or within the original bitstream information in the case of transcoding) for all these pictures. For example, if one picture has larger spatial variance or edge content than another picture then coding parameters may be adjusted accordingly. Similar conclusions can be drawn by comparing prediction errors. While the references are not shared, if other attributes, such as the prediction distance and the type of prediction are predefined or their characteristics could be modeled, then reliable relationships may be established. As used herein, pictures from which such statistics and prediction parameters are derived in relation to a current picture may be referred to as an "anchor" picture of the current picture, whether the anchor is actually a reference picture or not.

An embodiment translates rate control models that have been created for a given coding-unit type to rate control models each of which model a different coding-unit type. Such translation may be achieved using the MEMC framework statistics, previous coding passes, and statistics generated by the video encoder according to the first technique described in the section, "AN EXAMPLE FIRST TECHNIQUE—RATE CONTROL MODELING" described above. Relationships between N coding-unit types are used to initialize rate control models and ensure a fast convergence to optimal model parameters. Each of the N coding-unit types uses and updates its corresponding rate control model. For example, assume that at the beginning of an image sequence, the video encoder uses coding-unit types A and B a number of times before using coding-unit types C and D. At such point in the image sequence, rate control models for types A and B have attained good values for the respective model parameters. To improve rate control for types C and D, the parameters of C and D are initialized with translated parameters of A and B using the relationships already derived, such as by the first technique in the section, "AN EXAMPLE FIRST TECHNIQUE—RATE CONTROL MODELING," described above. Alternatively, coding parameters from A and B may be blended with coding parameters of C and D that approximate the A and B models.

For example, consider the linear and quadratic models of Equations 1 and 2. Rate control model comprises the parameters $\alpha_1$, $\alpha_2$, $c_1$, and $c_2$, and an estimate of the bits $b_{header}$ used to code header information for each picture of the same coding-unit type. Parameters $\alpha_1$ and $\alpha_2$ that have been derived for one coding-unit type (e.g., P-coded pictures) are scaled to parameters that model a different coding-unit type (e.g., B-coded pictures) by multiplying parameters $\alpha_1$ and $\alpha_2$ with the SAD of MEMC-based bi-prediction and then dividing the product with the SAD of MEMC-based uni-prediction. Such scaling may use a variant of Equation 5, for example:

$$\alpha_1^B = \alpha_1^P \frac{SAD_B^{MEMC}}{SAD_P^{MEMC}}, \qquad (8)$$

where $SAD_B^{MEMC}$ is the SAD value for the prediction of the current picture using bi-prediction with the MEMC framework, while $SAD_P^{MEMC}$ is the SAD value for the prediction of the previous picture using uni-prediction with the MEMC framework. Parameters $c_1$ and $c_2$ from Equation 2 are multiplied with the estimate of the SAD prediction error. SAD may be estimated using an MEMC framework and video encoder statistics for different types of coding-units. Thus, parameters $c_1$ and $c_2$ can be scaled and used to encode different coding-units. Scaling parameters and using the scaled parameters in different coding-units may effectuate rapid initialization of multiple rate control models. When encoding starts, these parameters have hard-coded generic values and are updated after each picture is coded. However, when multiple (e.g., three) rate control models are used, the parameter convergence to stable or optimal values can be somewhat (e.g., approximately three times) slower than when using a single rate control model. To deter degradation of end-user quality of service, e.g., at the beginning of new scenes, statistics are used to initialize rate control parameters of a certain coding-unit type (e.g., B-coded pictures) with parameters of another coding-unit type (e.g., P-coded pictures). It should be appreciated that initializing rate control parameters of a certain coding-unit type with parameters of another coding-unit type can be realized for any combination of different types of coding-units.

Figure 17:
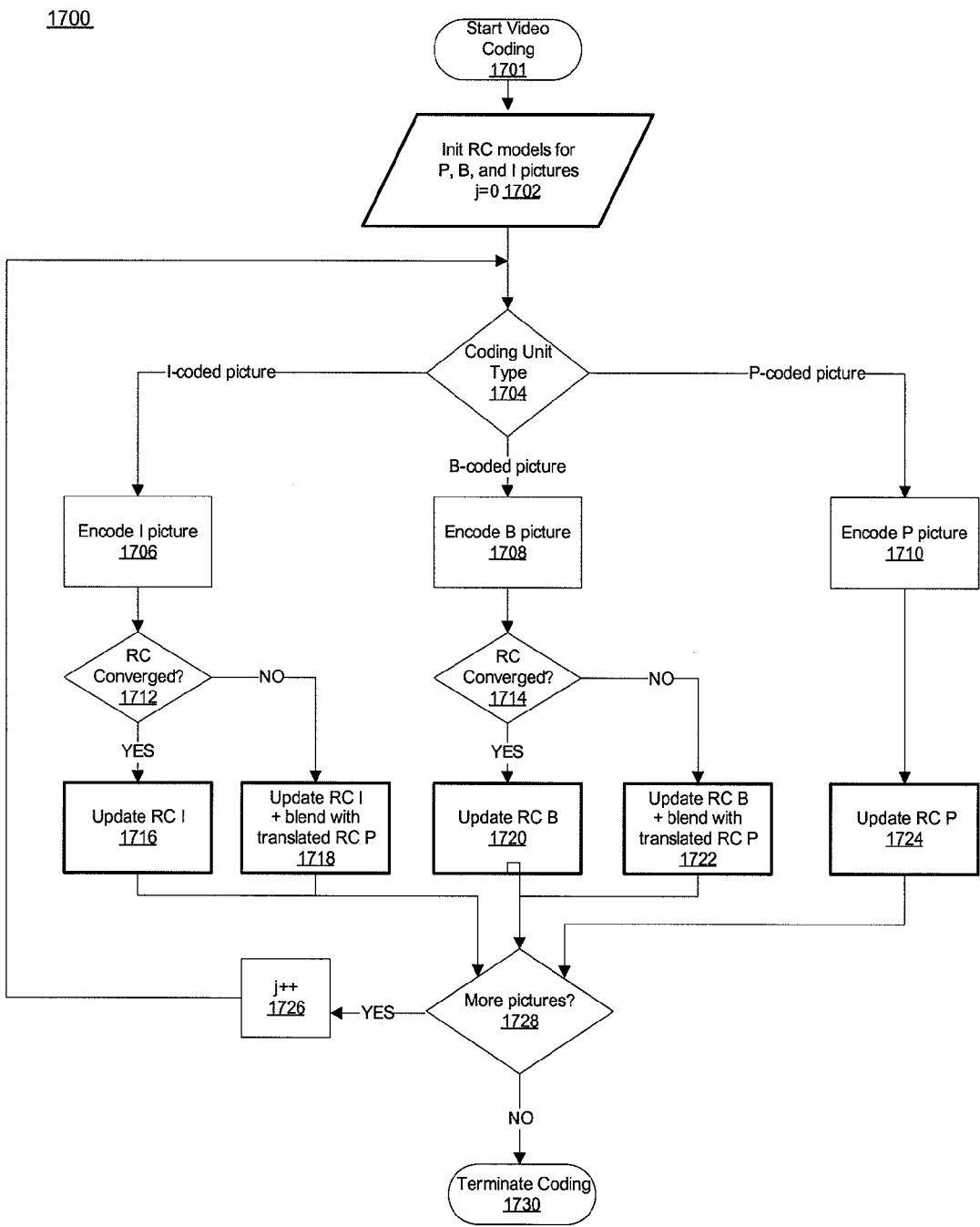
FIG. 17 is a flow diagram illustrating blending and combining translated rate control models that have been generated for different picture types, according to an embodiment.

An embodiment relates to initializing rate control parameters of a certain coding-unit type with parameters of another coding-unit type and is described with reference to FIG. 17. FIG. 17 is a flow diagram illustrating blending and combining translated rate control models generated for different coding-unit (e.g. picture) types (1700). Video coding begins (1702) and rate control models for P-, B-, and I-coded picture types are initialized and current picture index j is initialized to 0 (1702). A video encoder determines a coding-unit type for the current picture (1704). When the current picture is an I-coded picture, the picture is encoded (1706). The video encoder then determines if the rate control model for I-coded pictures converged (1712). If yes, then the rate control model for I-coded pictures is updated (1716). If no, the rate control model for I-coded pictures is updated and is blended with a translated rate control model for P-coded pictures (1718). When the current picture is a B-coded picture, the picture is encoded (1708) with coding parameters derived from the B-coded picture rate control model. A video encoder then determines if the rate control model for B-coded pictures converged (1714). If yes, then the rate control model for B-coded pictures is updated (1720). If no, the rate control model for B-coded pictures is updated and is blended with a translated rate control model for P-coded pictures (1722). When the current picture is a P-coded picture, the picture is encoded (1710) with coding parameters derived from the P-coded picture rate control model. A rate control model for P-coded pictures is updated (1724). The video encoder determines if there are more pictures to encode (1728). If yes, index j is incremented by one and control returns to determining the coding-unit type (1704). Otherwise, video coding terminates (1730).

An embodiment uses a multiple-pass video coder and replaces or enhances the MEMC framework with a first or prior pass of the video coder. The first or prior pass of the video coder may provide statistics.

2.0.3 An Example Third Technique—Bit Allocation

An embodiment of a technique for rate control and rate allocation employs part of the methodology presented in the first technique described herein, above to enable low delay video communication while at the same time achieving high visual quality for a compressed bit stream. The first technique improves the stability and performance of a rate control algorithm and the second technique uses an MEMC framework or multiple-pass coding statistics to improve rate control further. The third technique described in this section addresses rate control and rate allocation. Rate allocation sets bit targets for each picture; rate control adapts the coding parameters (which may comprise particular ratio values) of the picture to attain the bit target. Rate allocation and rate control can be accomplished in a variety of ways, examples of which are described herein, below.

In an embodiment, rate control uses a number N of coding-unit types to encode an image sequence and a number M of rate control models are buffered, for example as according to the first technique described above. For instance, the first technique is applied and yields relationships between the complexity and the bit rate usage of all N coding-unit types. Such relationships are then used to establish the optimal bit rate allocation among pictures that are coded with different coding-unit types. The derived bit targets are then used with the M buffered rate control models and the N–M approximated models for efficient rate control.

In an embodiment, rate control uses N coding-unit types to encode the image sequence and N rate control models are buffered. The first technique hereinabove is applied and yields relationships between the complexity and the bit rate usage of all N coding-unit types. Such relationships are then used to establish the optimal bit rate allocation among pictures that are coded with different coding-unit types. The derived bit targets are used with the N buffered rate control models for efficient rate control. While using N buffered rate control models may introduce a degree of complexity, they may add accuracy to bit rate control, which may be important in some applications.

Figure 15:
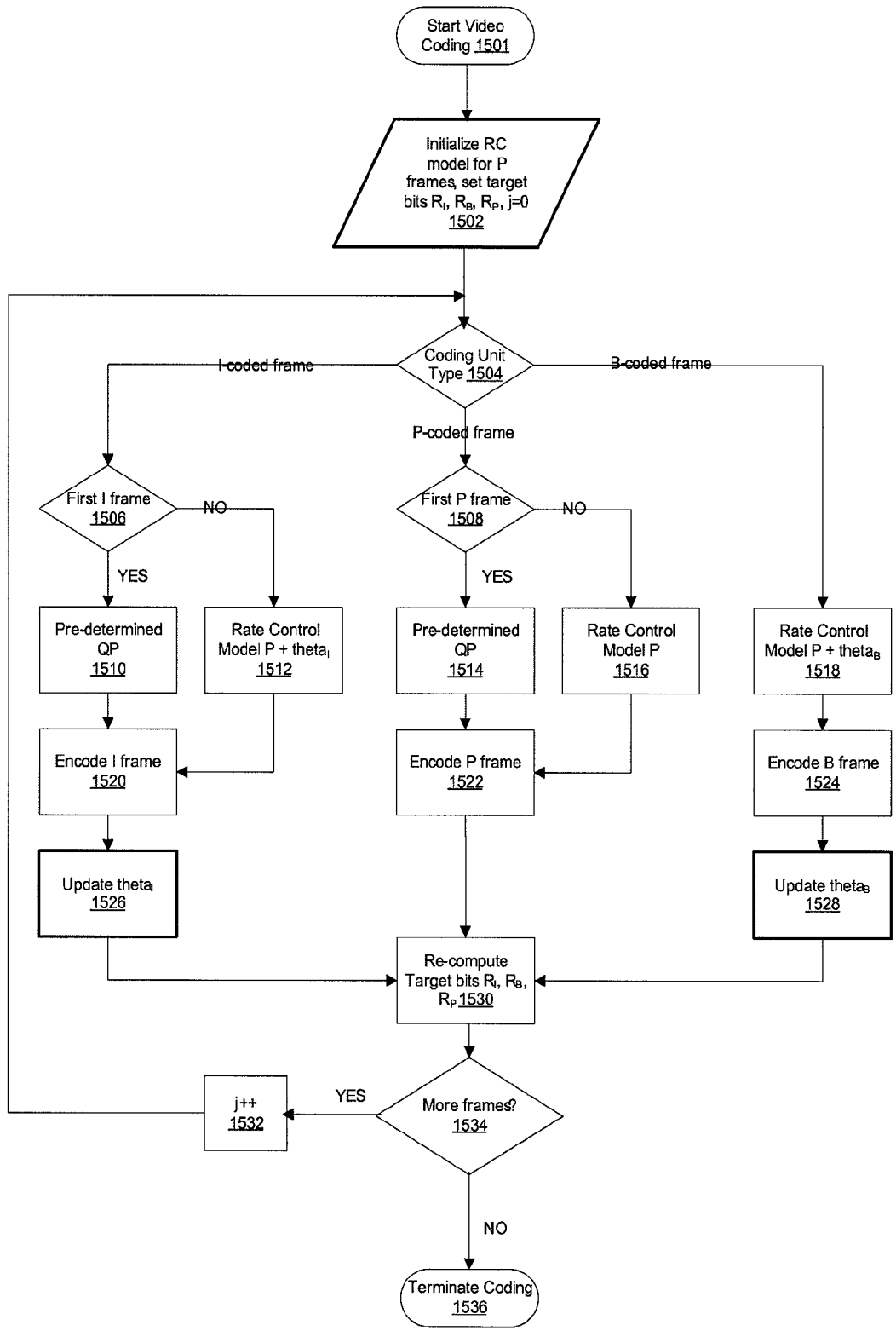
FIG. 15 is a flow diagram illustrating a video encoder using a single rate control model and $\theta$ ratios derived using the methodology of the first technique, according to an embodiment.

An example embodiment uses M buffered rate control models, as described with reference to FIG. 15. A flow diagram (1500) illustrates the determination of the number of bits which should be allocated to each picture-type to maximize compression performance, given an overall target of R bits per picture and using a single rate control model. A video encoder starts encoding an image sequence (1501). The video encoder initializes a rate control model for P-coded pictures, sets target bit values, R, for I-coded pictures ($R_I$), B-coded pictures ($R_B$), and P-coded pictures ($R_P$), and initializes the current picture index j to 0 (1502). The video encoder determines the coding-unit type (1504). When the coding-unit type is I-coded picture, the video encoder determines if the current picture is the first I-coded picture to be coded (1506). If yes, a specific QP is obtained (1510) and the current picture is encoded (1520). Otherwise, the rate control model for P-coded picture types and the theta ("θ") ratio for I-coded pictures, $\theta_I$, are applied (1512) and the current picture is encoded (1520). It should be appreciated that the θ ratio is a scaling parameter that may be used to obtain the number of bits for one coding-unit type from the number of bits of another coding-unit type. The video encoder updates $\theta_I$ (1526). When the coding-unit type is P-coded picture, the video encoder determines if the current picture is the first P-coded picture to be coded (1508). If yes, a specific QP is obtained (1514) and the current P-coded picture is encoded (1522). Otherwise, the rate control model for P-coded picture types is applied (1516) and the current P-coded picture is encoded (1522). When the coding-unit type is B-coded picture, the rate control model for P-coded picture types and θ ratio for B-coded pictures, $\theta_B$, are applied (1518). The current B-coded picture is encoded (1524) and $\theta_B$ is updated (1528). The video encoder re-computes the target bit rates, $R_I$, $R_B$, and $R_P$ (1530). The video encoder determines whether there are more pictures to encode (1534). If no, coding terminates (1536). If yes, the current picture index, j, is incremented (1532) and control returns to determining the coding-unit type for the new current picture (1504). It should be appreciated that this embodiment uses a single rate control model and the θ ratios are derived using the methodology of the first technique described hereinabove.

Figure 16:
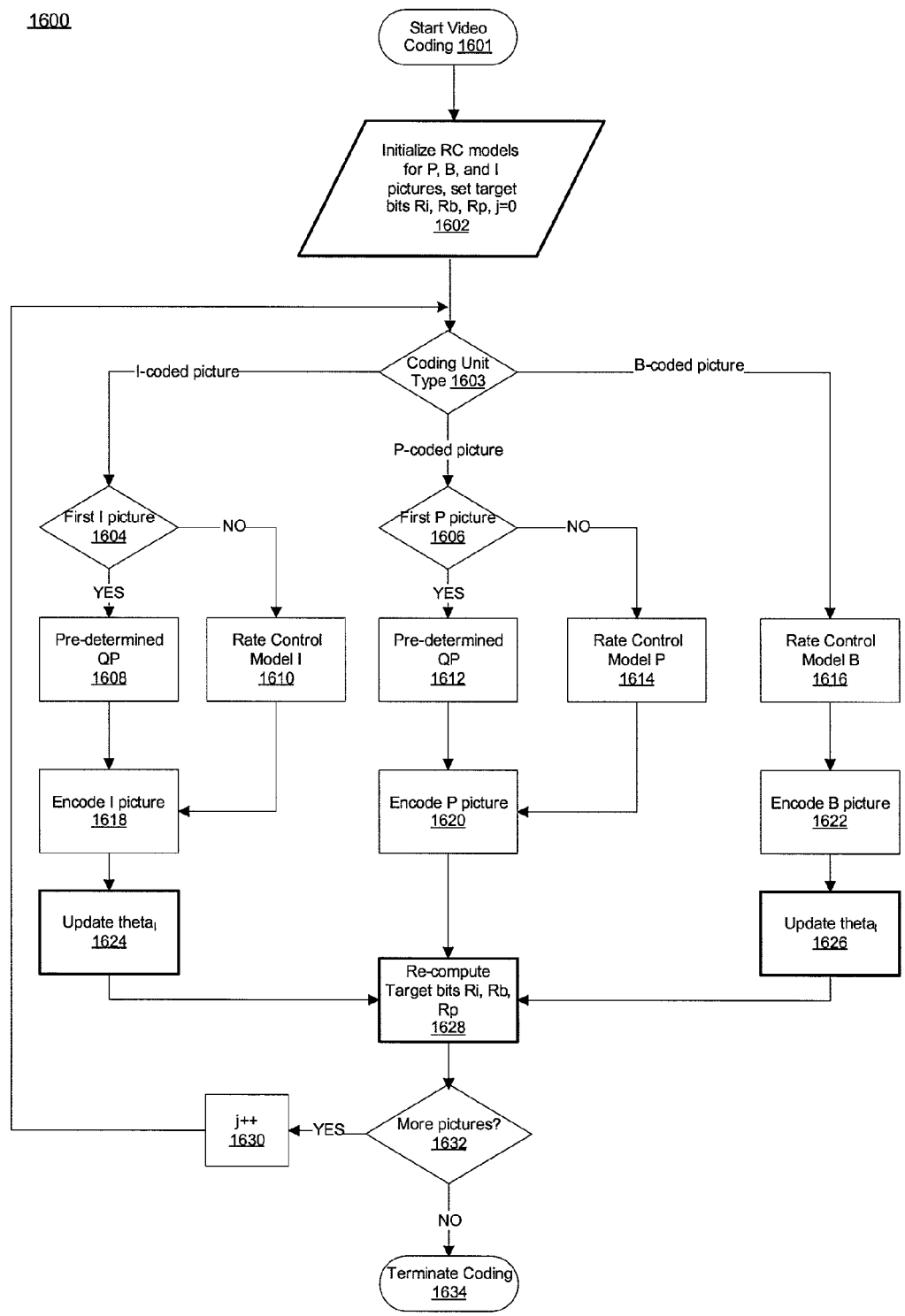
FIG. 16 is a flow diagram illustrating a video encoder using multiple rate control models and $\theta$ ratios derived using the methodology of the first technique, according to an embodiment.

An embodiment uses a number N of buffered rate control models. FIG. 16 is a flow diagram (1600) illustrating the determination of the number of bits which should be allocated to each picture type to maximize compression performance, given an overall target of R bits per picture and using multiple rate control models. A video encoder starts encoding an image sequence (1601). The video encoder initializes rate control models for P-, B-, and I-coded pictures, sets target bits values, R, for I-coded pictures ($R_I$), B-coded pictures ($R_B$), and P-coded pictures ($R_P$), and initializes the current picture index j to 0 (1602). The video encoder determines the coding-unit type (1603). When the coding-unit type is an I-coded picture, the video encoder determines if the current picture is the first I-coded picture to be coded (1604). If yes, a specific QP is obtained (1608) and the current I-picture is encoded (1618). Otherwise, the rate control model for I-coded picture types is applied (1610) and the current picture is encoded (1618). The video encoder updates $\theta_I$ (1624). When the coding-unit type is a P-coded picture, the video encoder determines if the current picture is the first P-coded picture to be coded (1606). If yes, a specific QP is obtained (1612) and the current P-coded picture is encoded (1620). If no, then the rate control model for P-coded picture types is applied (1614) and the current P-coded picture is encoded (1620). When the coding-unit type is a B-coded picture, the video encoder applies the rate control model for B-coded pictures (1616). The current B-coded picture is encoded (1622) and $\theta_B$ is updated (1626). The video encoder recomputes the target bit rates, $R_I$, $R_B$, and $R_P$ (1628) and determines whether there are more pictures to encode (1632). If no, coding terminates (1634). If yes, the current picture index, j, is incremented (1630) and control returns to determining the coding-unit type for the new current picture (1603). It should be appreciated that multiple rate control models may be used and the θ ratios are derived using the methodology of the first technique described herein, above.

Image sequences can have diverse content. For example, certain image sequences benefit from the use of B-coded pictures to a significant extent, while other image sequences may not benefit from B-coded pictures to any significant degree. Consider for example the low-delay transmission scenario of a static image sequence and an image sequence with high motion. A high motion sequence may use a significant number of bits for the encoding of B-coded pictures that are comparable to bits spent on coding P-coded pictures in order to achieve a sufficient quality target. A static sequence however may be encoded with sufficient quality with significantly fewer bits used for B-coded pictures, relative to the corresponding bits spent for the P-coded pictures. A fixed, specific rate allocation may thus yield sub-optimal image quality with content of significant diversity. In the context of rate allocation for video communication, determining how many bits to spend may thus be significant. For example, an optimization determination may be how many bits should be spend on B-coded pictures compared to how many bits should be spend for P-coded pictures and/or I-coded pictures. The scaling parameters $\theta^l_B$ and $\theta_I$ yield the ratios of bits used to encode a B-coded picture at level l, and an I-coded picture, in comparison to how many bits used to encode the same picture as a P-coded picture, where all picture types are normalized at the same coding parameters, e.g., the quantization parameter value $QP_{NORM}$. Such parameters can be derived from the first technique described hereinabove. Such parameters enable use of statistics gathered from the image sequence to adapt original pre-defined rate allocation targets. For instance, given observed ratios, or scaling parameters, $\theta^l_B$ and $\theta_I$, the number of bits allocated to each picture type to maximize compression performance may be determined, given an overall target of R bits per picture.

In an embodiment, let $\gamma_I$ denote the ratio of the number of bits $R_I$ allocated to an I-coded picture over the number of bits $R_P$ allocated to a P-coded picture. Then, $R_I = \gamma_I \times R_P$. Let $\gamma_B$ denote the ratio of the number of bits $R^l_B$ over the number of bits $R_P$ allocated to a P-coded picture, where l denotes the temporal level. Thus, $R^l_B = \gamma^l_B \times R_P$. Parameters $\gamma_I$ and $\gamma^l_B$ are computed as functions of scaling parameters $\theta_I$ and $\theta^l_B$ to account for different QP values ($QP_I$, $QP^l_B$, and $QP_P$) allocated to each picture type, e.g., for visual quality. Set $\gamma_I = \theta_I \times (f_{QP})^{QP_P - QP_I}$ and $\gamma_B = \theta_B \times (f_{QP})^{QP_P - QP^l_B}$. Computing parameters $\gamma_I$ and $\gamma^l_B$, may thus essentially compute the number of bits for each image type.

In an embodiment where I- and P-coded pictures are received at the decoder, it should be appreciated that for every $K_I$ picture, one picture is encoded as an I-coded picture (intra period). Between two consecutive I- or P-coded pictures, $N_B$ pictures are encoded as B-coded pictures. Let L denote the number of temporal binary decomposition levels as in FIG. 8 and $n^l_B$ denote the number of B-coded pictures that belong to level l out of the $N_B$ in total. The bits allocated to a P coded picture, $R_P$ (and in effect $R^l_B$ and $R_I$), are derived using the following expression:

$$R_P = \frac{R \times \max(1, K_I) \times (N_B + 1)}{\left(\sum_{l=0}^{H_{levels}} n^l_B \gamma^l_B\right) \times \max(1, P_I) + \gamma_I - 1} \quad (9)$$

In an embodiment, the ratios computation may be further extended by conditioning such ratios to the average QP of the reference picture or the difference of the QPs of the encoded picture and the coded picture's prediction reference picture. Thus, the ratio, $\theta^I_B$, is expressed as follows: $\theta^I_B(QP^I_B|QP_P)$ or $\theta^I_B(QP^I_B-QP_P)$. Scaling parameter $\theta_I$ of the I-coded pictures is not affected because the type of prediction is intra and does not extend outside the confines of the picture itself (e.g., intra prediction is not conditioned with respect to other pictures.) It should be appreciated that Equation 9 may be applied to a video sequence where the coding structure and intra period remain constant. To optimize compression efficiency, it should be appreciated that both the coding structure and insertion of intra-coded pictures may be adaptive. For instance, Equation 9 may be computed every time the coding structure changes or a non-periodic intra picture is inserted. In the case of non-periodic intra picture insertion, it should be appreciated that such computation may not consider that particular intra picture, e.g., such computation may effectively ignore that particular intra picture. Parameter R is adapted to account for over-spent or under-spent bits. The parameters γ are functions of scaling parameters θ and characterize the current bit rate relationships between the coding-units. It should be appreciated that if such coding structure is modified while coding a sequence, then such current bit rate relationships may be affected. For example, if the first part is coded using structure A, a second part is coded with structure B, and the third part is coded with structure A, the parameters γ for the third part are related to parameters γ of the first part. Thus, buffering parameters γ for the first part and using such parameters γ to initialize parameters γ for the third part is desirable. Furthermore, if the coding structures A and B are similar, then parameters from B may be translated into structure A parameters and used to refine the parameters of structure A in the second part, prior to reaching the third part. For example, if parameters for structure B are available from a distant part of the image sequence and the current structure is B, recent parameters of a similar structure (e.g., in rate-distortion-sense) may be sought that are more reliable and used.

Figure 21B:
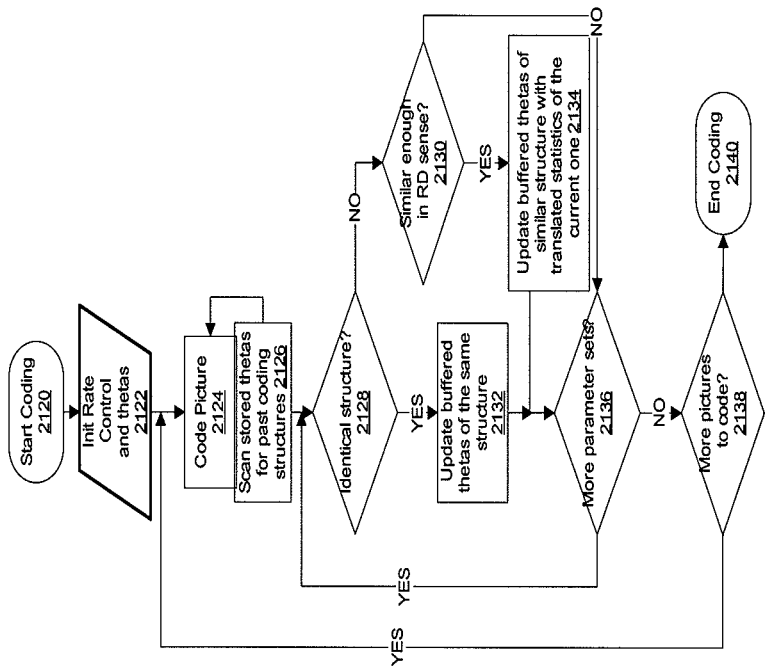
FIG. 21B is a flow diagram illustrating updating parameters for structure switch handling during coding, according to an embodiment.
Figure 21A:
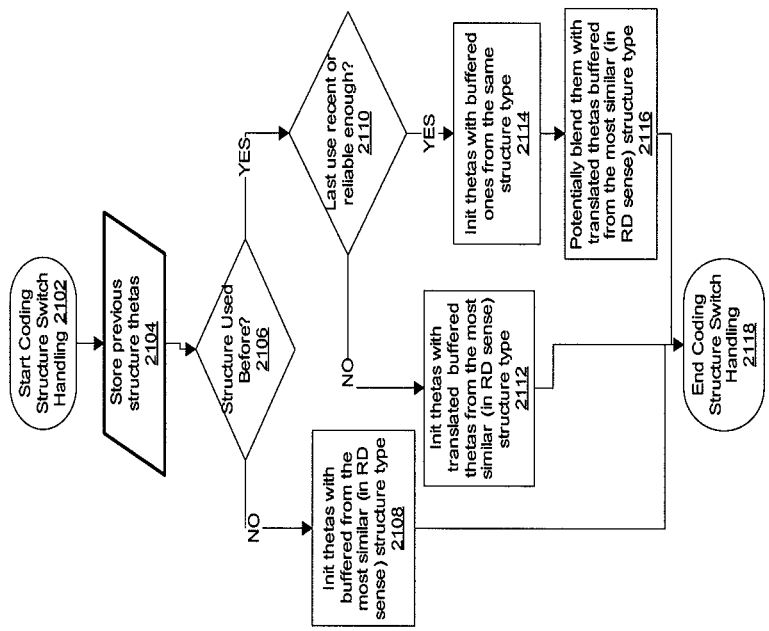
FIG. 21A is a flow diagram illustrating structure switch handling during coding, according to an embodiment.

In an embodiment and with reference to FIG. 21A, handling the θ scaling parameters when the coding structure is altered during coding may be achieved with a process that includes the following steps:

Step 1: Upon a switch in the coding structure (2102), buffer the current θ scaling parameters and label the buffered θ scaling parameters with the previous coding structure (2104); go to Step 2;

Step 2: Determine whether the new coding structure has been used before (2106), if yes, go to Step 3 (2110), otherwise go to Step 4 (2108).

Step 3: Determine whether the used coding structure is reliable (2110). If yes, initialize the new θ scaling parameters with the previously buffered θ scaling parameters corresponding to the same coding structure (2114). Otherwise, the new θ scaling parameters are insufficiently proximate to the buffered parameters, e.g., the difference between the new θ scaling parameters and the buffered θ scaling parameters is greater than a threshold value, and initialize the new θ scaling parameters with translated buffered parameters from a more recent structure that is similar in a rate-distortion sense (2112). In the latter case, for example, the similar structure is translated with respect to the current structure. In an embodiment, optionally blend the initialized θ scaling parameters with translated θ scaling parameters buffered from the most similar structure type in the rate-distortion sense (2116). Go to Step 5.

Step 4: Initialize the new θ scaling parameters with the θ scaling parameters of the previously used coding structure that is the most similar in a rate-distortion sense (2108). In this case, for example, the similar structure is translated with respect to the current structure. Go to Step 5.

Step 5: Terminate handling of coding structure switch (2118).

In an embodiment and with reference to FIG. 21B, updating the θ scaling parameters during coding may be achieved with a process that includes the following steps:

Step 1: Begin coding (2120). Initialize rate control and θ scaling parameters (2122). Code a picture (2124) and loop through (e.g., scan through) stored (e.g., buffered) parameters for past coding structures (2126);

Step 2: For each stored parameters set, determine whether the current coding structure is the same as the stored set (2128); if yes go to Step 3; otherwise go to Step 4;

Step 3: Update stored θ scaling parameters with statistics of the current picture (2132). Go to Step 5;

Step 4: Determine whether the current coding structure is similar to the stored parameter set (e.g., whether the difference between the new θ scaling parameters and the buffered θ scaling parameters is greater than a threshold value) in a rate-distortion sense (2130). If yes, update buffered θ scaling parameters of similar structure in a rate-distortion sense with translated statistics (e.g., θ scaling parameters) of the current picture (2134).

Step 5: Go to Step 2, until all stored parameter sets have been considered (2138). Otherwise, end coding (2140).

2.0.4 An Example Fourth Technique—Transcoding

A fourth example technique, described in this section, improves transcoding using the first and second techniques described hereinabove. An example of transcoding is converting from one digital codec to another. While it may be possible to apply the MEMC framework on pictures decoded from the bit stream, complexity may add costs to do so. The compressed bit stream however can provide information that may obviate pre-analysis, as with the MEMC framework or multiple-pass video coding.

Figure 18:
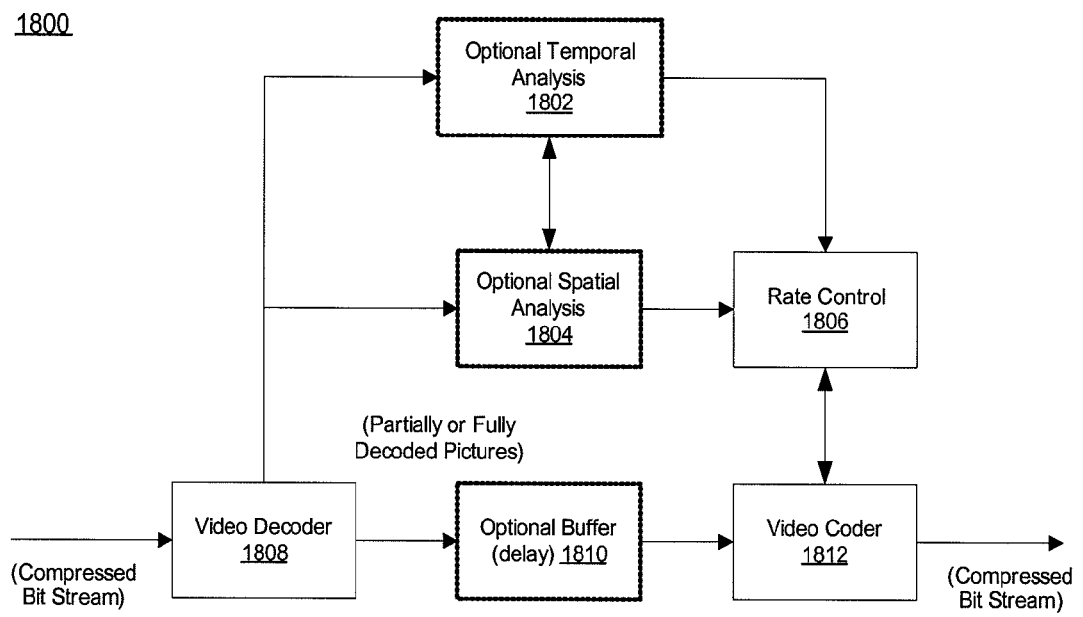
FIG. 18 is a schematic diagram illustrating components of a transcoder module, according to an embodiment.

An example embodiment that relates to transcoding is described with reference to FIG. 18. FIG. 18 is a schematic diagram illustrating architectural components of an example transcoder 1800. A compressed bit stream enters a video decoder and is fully or partially decoded (1808). Fully or partially decoded pictures are input into three optional modules. One module performs temporal analysis (1802), such as that in an MEMC framework. One module performs spatial analysis (1804), such as the spatial statistics analysis module of FIG. 7. Spatial and temporal analysis may be performed jointly or independently. Moreover, spatial and temporal analysis may be performed with a spatio-temporal analysis module. An optional buffer (1810) may add useful latency to inputting decoded pictures to the video encoder. Input from a rate control module (1806) and input pictures, which may be optionally buffered (buffer 1810), are sent to video encoder (1812) for encoding and compressing a desired bit stream.

Information may be derived from the compressed bit stream. The derived information may include:
(a) Motion parameters;
(b) Weighted prediction parameters;
(c) Quantized transformed coefficients of the prediction residuals or/and the prediction residuals after inverse quantization and transform;
(d) Coding modes (intra or inter);
(e) Quantization parameters (QP); and/or
(f) Number of bits spent to code each block, slice, or frame.

The prediction residual information together with the QP and the number of bits used to represent the picture may also be used to estimate the coding complexity and/or a prediction error metric (such as the SAD.) Coding modes, including intra-coding modes, may yield useful spatial, temporal, or spatio-temporal information. For example, an intra coding mode can classify a block on the basis of a frequency discrimination of content therein (e.g., block content characterized with low or high frequency components.) Blocks coded as intra in a predictive slice may comprise more bits for compression, in relation to blocks coded as inter. This may be significant when the rate control basic units are in the order of some macroblocks (MBs), and e.g., smaller than a picture. Such a block may belong, for instance, to a new object. The coding complexity of a picture can be computed as a function of the QP that was used and the bits used to code the picture. For example, coding complexity could be set to the product of the quantization step size and the number of bits. By detecting and observing the block prediction residuals or the quantized transformed coefficients from the bit stream, bit usage for short rate control basic units may be estimated, as described above. These estimates can be combined to improve the prediction error estimate for that picture as a weighted average of the number of bits times the quantization step size plus, the absolute sum of the coded prediction residuals or, the de-quantized transformed coefficients. Granularity associated with these statistics allows such computation, on a picture-and/or a block-basis. The prediction error SAD may also be estimated from the absolute sum of prediction residuals. Motion and weighted prediction parameters can be used to initialize the respective parameters at the encoder, but can also serve as indicators of, e.g., temporal correlation and fading scene transitions or local illumination changes. Temporal correlation information can be used to save bits from pictures that have low temporal correlation (e.g., frames with high motion content). Rate allocation can also be adjusted during a fading transition, which may heighten coding efforts with respect to a "regular" scene. In an embodiment, bit rate and quality relationships of an original bit stream are first estimated. During rate control processing for the transcoding stage, the rate control models for each coding-unit type are initialized and adapted using the previous three techniques described hereinabove to achieve visual quality and fast convergence of the rate control models. For instance, the first example technique described above may be used to derive relationships between different types of coding-units. The second example technique described above may be used to adapt coding parameters and model parameters of different coding-unit types to promote faster convergence and better quality. The third technique may be used to derive optimal rate allocation among the different coding-unit types that are then used to drive the rate control model.

It should be appreciated that the techniques and methodologies described herein may be applicable to modern video codecs such as MPEG-2, H.264/AVC, VC-1 and MPEG-4.

3.0 Implementation Mechanisms

Figure 19:
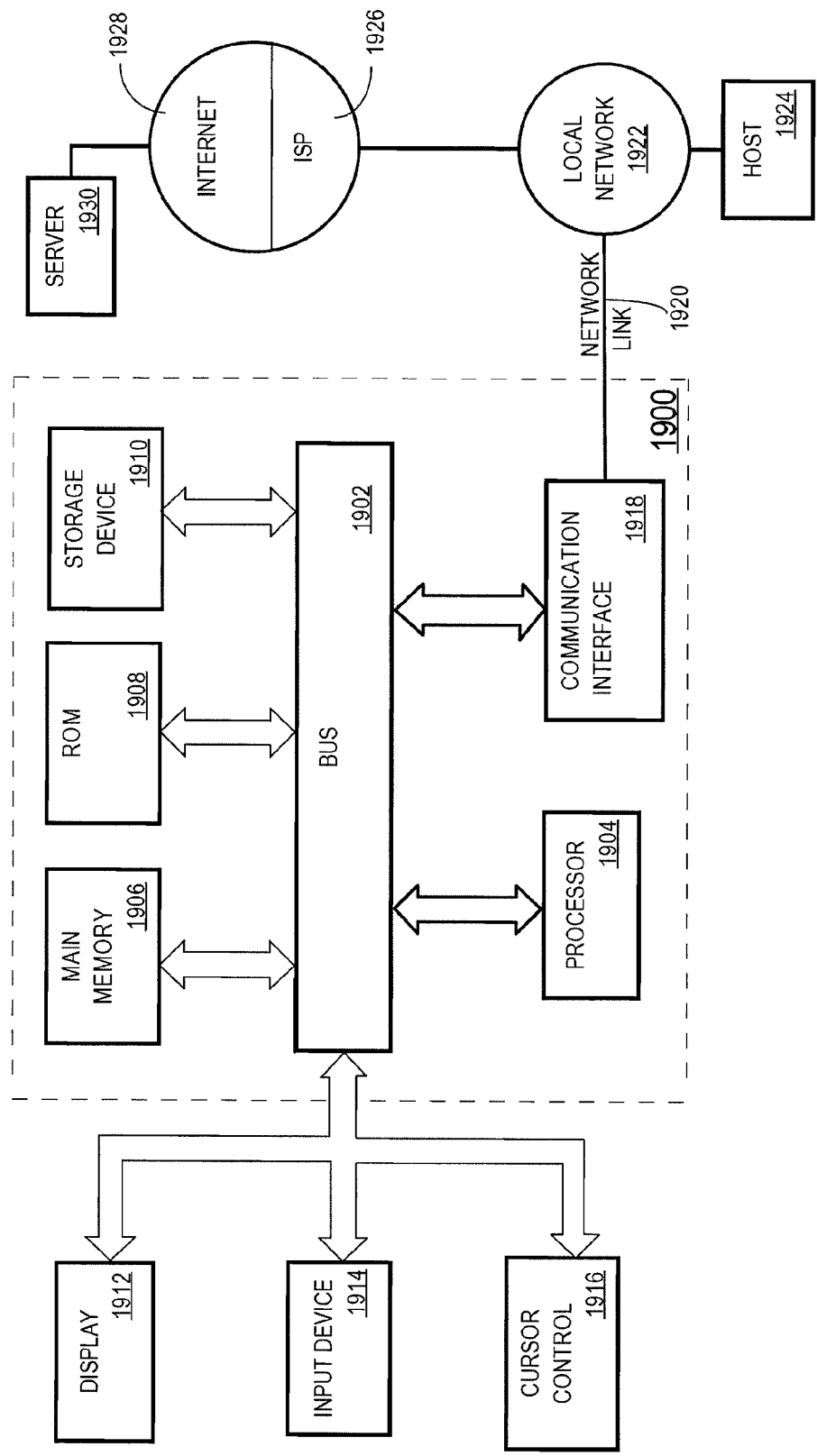
FIG. 19 is a block diagram illustrating a computer system upon which an embodiment may be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a liquid crystal display (LCD), plasma display, cathode ray tube (CRT), or the like, for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for implementing the techniques described herein. According to one embodiment of the invention, those techniques are performed by computer system 1900 in response to processor 1904 executing one or more sequences of one or more instructions contained in main memory 1906. Such instructions may be read into main memory 1906 from another machine-readable medium, such as storage device 1910. Execution of the sequences of instructions contained in main memory 1906 causes processor 1904 to perform the process steps described herein. In some embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1900, various machine-readable media are involved, for example, in providing instructions to processor 1904 for execution. Such a medium may take many forms, including but not limited to storage media and transmission media. Storage media includes both non-volatile media and volatile media. Non-volatile media includes, for example, optical or magnetic disks, such as storage device 1910. Volatile media includes dynamic memory, such as main memory 1906. Transmission media may include coaxial cables, copper (or another conductor) wire and fiber optics, including wires that comprise bus 1902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other legacy or other physical medium with patterns of holes or darkenings, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a digital subscriber line (DSL), cable, or other modem (modulator/demodulator) to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution. In this manner, computer system 1900 may obtain application code in the form of a carrier wave.

4.0 Enumerated Example Embodiments

Statistics for estimating quantization factors of a coding-unit type (e.g., B-coded or I-coded) pictures are determined from other, possibly different (e.g., P-coded) pictures, or previously coded coding-units. Bit rate and quality relationships between such coding-unit types may be used with the quantization parameters. Estimating bit rate and quality relationships between coding-unit types enables accurate rate control for pictures regardless of their coding-unit type. Bit rate and quality relationships between coding-unit types can be used with multiple rate control models to increase compression. Rate control parameters may be adjusted with statistics generated by a motion estimation and compensation framework. Rate control performance may be controlled in transcoding compressed bit streams.

Embodiments of the present invention may thus relate to one or more of the enumerated examples listed below.

1. A method, comprising:
   receiving information from one or more motion estimation and motion compensation (MEMC) modules, a spatial statistics analysis module, a first coding pass, or a previous pass of multiple-coding passes;
   performing one or more of:
      estimating a prediction error of a current picture as a function of at least one of:
         a prediction error of two or more previously coded pictures; or
         statistics gathered at the MEMC; and
      estimating spatial variance of the current picture as a function of spatial variance of previously coded pictures gathered at the spatial statistic analysis module.

2. The method of enumerated example embodiment 1, wherein previously coded pictures comprise information from the first coding pass or the previous pass of multiple coding passes.

3. The method of enumerated example embodiment 1, wherein statistics gathered at the MEMC comprise one or more of:
   prediction error values;
   translational motion-vector values;
   weighted-prediction weights and offsets; and
   motion parameters associated with one or more higher-order motion models.

4. The method of enumerated example embodiment 1, further comprising:
   modifying rate control parameters based on a divergence of motion models employed by one or more of:
      one or more prior MEMC modules; or
      motion models and coding statistics of the prior coding passes and the motion model employed for a current encoding pass.

5. The method of enumerated example embodiment 1, wherein the estimated prediction error comprises weighted prediction parameters estimated by the MEMC module.

6. The method of enumerated example embodiment 1, further comprising:
   using one or more of at least one past picture or at least one future picture as one or more motion-compensated available anchor pictures to predict the current picture; and
   computing a complexity estimate of the current picture with respect to one or more of the anchor pictures; and
   with two or more prediction references, computing at least one value reflecting a complexity relationship between at least two of the available reference pictures.

7. The method of enumerated example embodiment 1, further comprising:
   using one or more of at least one past picture or at least one future picture as one or more motion-compensated reference pictures to predict the current picture; and
   upon using the at least one future picture, computing an estimated complexity characteristic value by comparing information related to one or more prediction errors associated with the at least one future picture and one or more motion-vectors associated with the at least one future picture;

wherein the information relating to the one or more prediction errors is obtained from the received information from the MEMC module.

8. The method of enumerated example embodiment 4, further comprising:

modifying the rate control parameters using a difference metric between motion model parameters from the received information from the MEMC or first-pass or previous pass coding statistics and motion model parameters that relate to an encoder.

9. A method, comprising:

receiving a coding structure, scaling parameters for one or more coding-units, and bit targets per picture per the one or more coding-units; and computing a number of bits to allocate to each of the one or more coding-units using any of:
the coding structure;
scaling parameters; and
bit targets.

10. The method of enumerated example embodiment 9, wherein computing the number of bits further comprises:

computing new parameters as functions of the scaling parameters and allowing quantization parameter (QP) values allocated to a first coding-unit of the one or more coding-units be different from QP values allocated to a second coding-unit of the one or more coding-units.

11. The method of enumerated example embodiment 9, further comprising:

adjusting the scaling parameters by using an average QP value of a reference picture or by using the difference of the QP values of a coded picture corresponding to a current picture and the QP values of a prediction reference picture corresponding to the current picture.

12. The method of enumerated example embodiment 9, further comprising:

receiving one or more new coding structures or an inserted non-periodic intra picture; and re-computing the number of bits to allocate.

13. A method, comprising the steps of:

receiving a current picture at a video encoder for a number N of coding-unit types;

wherein the video encoder comprises a number M of rate control models, wherein the number N is greater than the number M; and coding the current picture using one or more of:
specific information;
one or more coding parameters from at least one of the M rate control models; or
one or more coding parameters obtained by translating at least one of the one or more coding parameters from the at least one of the M rate control models.

14. The method as recited in enumerated example embodiment 13, wherein the current picture comprises a first picture in an image sequence;

wherein the coding step comprises the step of using coding parameters that satisfy one or more rate constraints;

wherein a coding-unit type that characterizes the current picture corresponds to one of the M rate control models; and wherein, upon coding the current picture, the method further comprises the steps of:
updating the corresponding one out of M rate control models;
gathering statistics that relate to the first picture; and
buffering the gathered statistics.

15. The method as recited in enumerated example embodiment 14, wherein the current picture comprises a picture that is coded subsequent to the first picture in the image sequence; and wherein the coding step further comprises the steps of:
determining a coding-unit type that characterizes the current picture; and
associating the specific information to the current picture when the current picture comprises a first picture of the determined coding-unit type;
wherein the added specific information comprises one or more of:
at least one scaling or translation parameter;
at least one iteratively estimated coding parameter; or
the gathered statistics.

16. The method as recited in enumerated example embodiment 15, wherein the current picture comprises a picture that is subsequent to the first picture of the determined coding-unit type; and wherein the coding step further comprises the steps of:
determining a rate control model that corresponds to the determined coding-unit type; and
using one or more rate control model parameters of the determined rate control model when the determined rate model is one of the M rate control models; and
updating the determined rate control model.

17. The method as recited in enumerated example embodiment 16, wherein the determined rate model is other than one of the M rate control models; and wherein the coding step further comprises the step of:
deriving the determined rate control model.

18. The method as recited in enumerated example embodiment 17, wherein the deriving step comprises the steps of:

processing the buffered statistics gathered for each of the coding-unit types;

translating parameters from at least one of the M rate control models;

generating the translated parameters, based on the translating step;

applying the translated parameters to the current picture;

executing the gathering step for the corresponding coding unit type; and executing the buffering step for the gathered statistics.

19. The method as recited in enumerated example embodiment 18, wherein the buffering step comprises the step of buffering the gathered statistics in a statistics buffer that corresponds to the determined coding-unit type.

20. The method of enumerated example embodiment 13, further comprising:

normalizing bit statistics to a same coding parameter for all coding-unit types.

21. The method of enumerated example embodiment 13, further comprising:

receiving an adapted prediction structure comprising at least one new coding-unit type;

determining whether the new coding-unit type was present previously; and using gathered statistics and a rate control model of the previously present coding-unit type when the new coding-unit type was present previously.

22. The method of enumerated example embodiment 13, further comprising:

receiving an adapted prediction structure comprising at least one new coding-unit type;

determining whether the new coding-unit type was present previously; and initializing a rate control model that corresponds to the new coding-unit type by translating a previously maintained rate control model when the new coding-unit type was not present previously.

23. The method of enumerated example embodiment 13, further comprising:
   assigning rate control models to P-coded pictures and estimating scaling parameters for I-coded pictures and for B-coded pictures or assigning rate control models to I-coded pictures and estimating scaling parameters for B-coded pictures and for P-coded pictures;
   wherein the scaling parameters represent an average of stored bit ratios.

24. The method of enumerated example embodiment 18, wherein translating parameters further comprises using statistics gathered at a motion estimation and motion compensation (MEMC) module or a previous coding pass.

25. The method of enumerated example embodiment 24, wherein statistics gathered at the MEMC comprise prediction errors.

26. A method, comprising:
   receiving a current picture;
   determining a scene type for the current picture;
   based on the determined scene type, performing one or more of the steps of:
      selecting a rate control model that is appropriate for the scene type;
      adjusting parameters of a default rate control model; and
      using the default rate control model.

27. The method of enumerated example embodiment 26, wherein determining a scene type for the current picture comprises analyzing spatio-temporal statistics from a motion estimation and motion compensation module or from a previous coding pass of a multiple-pass video coder.

28. A method, comprising:
   receiving an image sequence wherein a first number of pictures of the image sequence are of a first coding-unit type;
   coding the first number of pictures of the image sequence using a first rate control model corresponding to the first coding-unit type; and
   after coding the first number of pictures of the image sequence using a first rate control model corresponding to the first coding-unit type, coding a current picture of the image sequence, wherein the current picture corresponds to a second coding-unit type different from the first coding-unit type, by translating parameters of the first rate control model.

29. The method of enumerated example embodiment 28, wherein translating parameters of the first rate control model comprises using statistics from a motion estimation and motion compensation module or a previous coding pass.

30. A method, comprising:
   initializing a number M of rate control models;
   for a number N of coding-unit type pictures, computing N target bits;
   wherein the number N is greater than or equal to the number M;
   receiving a current picture;
   determining a coding-unit type of the N coding-unit types for the current picture;
   when the coding-unit type of the current picture is a particular coding-unit type, performing:
      using a particular coding parameter corresponding to the particular coding-unit type or using a particular rate control model, of the M rate control models, that corresponds to the particular coding-unit type;
      encoding the current picture based on the particular coding parameter or particular rate control model;
      updating a scaling parameter corresponding to the particular coding-unit type; and
      re-computing the N target bits for each coding-unit type.

31. The method as recited in enumerated example embodiment 30, further comprising:
   when the coding-unit type of the current picture is a second coding-unit type different from the particular coding-unit type, performing:
      using a second coding parameter corresponding to the second coding-unit type or using a second rate control model, of the M rate control models, that corresponds to the second coding-unit type;
      encoding current picture based on the second coding parameter or the second rate control model; and
      re-computing target bits.

32. The method as recited in enumerated example embodiment 31, further comprising:
   when the coding-unit type of the current picture is a third coding-unit type that is different from the particular coding-unit type and from the second coding-unit type, performing:
      using a third rate control model, of the M rate control models, and using a third scaling parameter that corresponds to the third coding-unit type and that corresponds to the third rate control model;
      encoding current picture based on the third rate control model and the third scaling parameter;
      updating the third scaling parameter; and
      re-computing target bits.

33. The method of enumerated example embodiment 32, wherein the particular coding-unit type is a P-coded picture, the second coding-unit type is an I-coded picture, and the third coding-unit type is a B-coded picture.

34. A method, comprising:
   initializing a video encoder for a number N of coding-unit types, wherein the video encoder comprises a number M of rate control models, wherein each of the M rate control models corresponds to a coding-unit type of the N coding-unit types, and wherein N is greater than M;
   receiving a current picture;
   determining a coding-unit type, of the N coding-unit types, that corresponds to the current picture; and
   when the coding-unit type of the current picture is a particular coding-unit type, performing:
      encoding the current picture using a particular rate control model that corresponds to the particular coding-unit type;
      determining whether the particular rate control model converged;
      updating the particular rate control model; and
      blending the particular rate control model with a translated second rate control model of the M rate control models corresponding to a second coding-unit type of the N coding-unit types, when the particular rate control model did not converge.

35. The method as recited in enumerated example embodiment 34, further comprising:
   when the coding-unit type of the current picture is a third coding-unit type of the N coding-unit types, performing:
      encoding the current picture with parameters from a third rate control model, of the M rate control models, that corresponds to the third coding-unit type;

determining whether the third rate control model converged;
updating the third rate control model; and
blending the third rate control model with the translated second rate control model for the second coding-unit type, when the third rate control model did not converge.

36. The method as recited in enumerated example embodiment 34, further comprising:
when the coding-unit type of the current picture is the second coding-unit type, then
encoding the current picture with parameters from the second rate control model; and
updating the second rate control model.

37. The method of enumerated example embodiment 36, wherein the first coding-unit type is an I-coded picture, the second coding-unit type is a P-coded picture, and the third coding-unit type is a B-coded picture.

38. A method, comprising:
receiving a first compressed bit stream of one or more pictures;
decoding, fully or partially, the compressed bit stream of one or more pictures;
sending the fully or partially decoded pictures to one or more of:
a module for performing temporal analysis on one or more of the fully or partially decoded one or more pictures; and
a module for performing spatial analysis on one or more of the fully or partially decoded one or more pictures;
sending, to a rate control model, output from one or more of:
the performing temporal analysis on the one or more of the fully or partially decoded one or more pictures; and
the performing spatial analysis on the one or more of the fully or partially decoded one or more pictures;
receiving, at a video coder, rate control parameters from the rate control model and the fully or partially decoded one or more pictures; and
encoding and compressing, by the video coder, the received fully or partially decoded one or more pictures using the received rate control parameters into a second bit stream.

39. The method of enumerated example embodiment 38, wherein sending the fully or partially decoded one or more pictures further comprises sending the fully or partially decoded one or more pictures to a buffer for adding latency;
wherein receiving at a video coder further comprises receiving, at a video coder, output from the buffer; and
wherein encoding and compressing the received fully or partially decoded one or more pictures using the received rate control parameters into a second bit stream further comprises encoding and compressing the received output from the buffer using the received rate control parameters into a second bit stream.

40. The method of enumerated example embodiment 38, wherein the module that performs temporal analysis is a motion estimation and motion compensation module.

41. The method of enumerated example embodiment 38, wherein the video coder is a video coder for a number N of coding-unit types and that comprises a number M of rate control models, wherein N>M, and wherein encoding and compressing, by the video coder, further comprises computing parameters for N–M coding-unit types by translating parameters from the M rate control models and using the translated parameters.

42. The method of enumerated example embodiment 38, wherein encoding and compressing further comprises encoding and compressing using information from a first coding pass or from a previous pass of multiple-coding passes.

43. A computer-readable medium storing one or more sequences of instructions for video processing, wherein execution of the one or more sequences of instructions by one or more processors causes the one or more processors to perform the steps of:
receiving information from one or more motion estimation and motion compensation (MEMC) modules, a spatial statistics analysis module, a first coding pass, or a previous pass of multiple-coding passes;
performing one or more of:
estimating a prediction error of a current picture as a function of at least one of:
a prediction error of two or more previously coded pictures; or
statistics gathered at the MEMC; and
estimating spatial variance of the current picture as a function of spatial variance of previously coded pictures gathered at the spatial statistic analysis module.

44. A computer-readable medium storing one or more sequences of instructions for video processing, wherein execution of the one or more sequences of instructions by one or more processors causes the one or more processors to perform the steps of:
receiving a coding structure, scaling parameters for one or more coding-units, and bit targets per picture per the one or more coding-units; and
computing a number of bits to allocate to each of the one or more coding-units using any of:
the coding structure;
scaling parameters; and
bit targets.

45. A computer-readable medium storing one or more sequences of instructions for video processing, wherein execution of the one or more sequences of instructions by one or more processors causes the one or more processors to perform the steps of:
receiving a current picture at a video encoder for a number N of coding-unit types;
wherein the video encoder comprises a number M of rate control models, wherein the number N is greater than the number M; and
coding the current picture using one or more of:
specific information;
one or more parameters from at least one of the M rate control models; and
one or more parameters obtained by translating at least one of the one or more parameters from the at least one of the M rate control models.

46. A computer-readable medium storing one or more sequences of instructions for video processing, wherein execution of the one or more sequences of instructions by one or more processors causes the one or more processors to perform the steps of:
receiving a current picture;
determining a scene type for the current picture;
based on the determined scene type, performing one or more of the steps of:
selecting a rate control model that is appropriate for the scene type;
adjusting parameters of a default rate control model; and
using the default rate control model.

47. A computer-readable medium storing one or more sequences of instructions for video processing, wherein execution of the one or more sequences of instructions by one or more processors causes the one or more processors to perform the steps of:
  receiving an image sequence wherein a first number of pictures of the image sequence are of a first coding-unit type;
  coding the first number of pictures of the image sequence using a first rate control model corresponding to the first coding-unit type; and
  after coding the first number of pictures of the image sequence using a first rate control model corresponding to the first coding-unit type, coding a current picture of the image sequence, wherein the current picture corresponds to a second coding-unit type different from the first coding-unit type, by translating parameters of the first rate control model.

48. A computer-readable medium storing one or more sequences of instructions for video processing, wherein execution of the one or more sequences of instructions by one or more processors causes the one or more processors to perform the steps of:
  initializing a video encoder for a number N of coding-unit types, wherein the video encoder comprises a number M of rate control models, wherein each of the M rate control models corresponds to a coding-unit type of the N coding-unit types, and wherein N is greater than M;
  receiving a current picture;
  determining a coding-unit type, of the N coding-unit types, that corresponds to the current picture; and
  when the coding-unit type of the current picture is a particular coding-unit type, performing:
    encoding the current picture using a particular rate control model that corresponds to the particular coding-unit type;
    determining whether the particular rate control model converged;
    updating the particular rate control model; and
    blending the particular rate control model with a translated second rate control model of the M rate control models corresponding to a second coding-unit type of the N coding-unit types, when the particular rate control model did not converge.

49. A computer-readable medium storing one or more sequences of instructions for video processing, wherein execution of the one or more sequences of instructions by one or more processors causes the one or more processors to perform the steps of:
  receiving a first compressed bit stream of one or more pictures;
  decoding, fully or partially, the compressed bit stream of one or more pictures;
  sending the fully or partially decoded one or more pictures to one or more of:
    a module for performing temporal analysis on one or more of the fully or partially decoded one or more pictures; and
    a module for performing spatial analysis on one or more of the fully or partially decoded one or more pictures;
  sending, to a rate control model, output from one or more of:
    the performing temporal analysis on the one or more of the fully or partially decoded one or more pictures; and
    the performing spatial analysis on the one or more of the fully or partially decoded one or more pictures;
  receiving, at a video coder, rate control parameters from the rate control model and the fully or partially decoded one or more pictures; and
  encoding and compressing, by the video coder, the fully or partially decoded one or more pictures using the received rate control parameters into a second bit stream.

50. An apparatus, comprising:
  an information receiver that receives information from one or more motion estimation and motion compensation (MEMC) modules, a spatial statistics analysis module, a first coding pass, or a previous pass of multiple-coding passes; and
  a prediction error estimator that estimates a prediction error of a current picture as a function of at least one of:
    a prediction error of two or more previously coded pictures; or statistics gathered at the MEMC; and
  a spatial variance estimator that estimates spatial variance of the current picture as a function of spatial variance of previously coded pictures gathered at the spatial statistic analysis module.

51. An apparatus, comprising:
  a coding structure receiver that receives a coding structure, scaling parameters for one or more coding-units, and bit targets per picture per the one or more coding-units; and
  a bit allocating subsystem that computes a number of bits to allocate to each of the one or more coding-units using any of:
    the coding structure;
    scaling parameters; and
    bit targets.

52. An apparatus, comprising:
  a picture receiver that receives a current picture at a video encoder for a number N of coding-unit types;
  wherein the video encoder comprises a number M of rate control models, wherein the number N is greater than the number M; and
  a coding subsystem that codes the current picture using one or more of:
    specific information;
    one or more parameters from at least one of the M rate control models; and
    one or more parameters obtained by translating at least one of the one or more parameters from the at least one of the M rate control models.

53. An apparatus, comprising:
  a picture receiver that receives a current picture;
  a scene type determining subsystem that determines a scene type for the current picture; and
  one or more of:
  a rate control model selector that selects a rate control model that is appropriate for the scene type, based on the determined scene type;
  a default rate control model that is used based on the determined scene type; and
  a parameter adjustor subsystem that adjusts parameters of the default rate control model, based on the determined scene type.

54. An apparatus, comprising:
  an image sequence receiver that receives an image sequence wherein a first number of pictures of the image sequence are of a first coding-unit type;
  a first coding subsystem that codes the first number of pictures of the image sequence using a first rate control model corresponding to the first coding-unit type; and
  a second coding subsystem that codes a current picture of the image sequence, after the first number of pictures of the image sequence using the first rate control model corresponding to the first coding-unit type is coded, and wherein the current picture corresponds to a second coding-unit type different from the first coding-unit type, by translating parameters of the first rate control model.

55. An apparatus, comprising:
   an initializing subsystem that initializes a video encoder for a number N of coding-unit types, wherein the video encoder comprises a number M of rate control models, wherein each of the M rate control models corresponds to a coding-unit type of the N coding-unit types, and wherein N is greater than M;
   a picture receiver that receives a current picture;
   a coding-unit type determining subsystem that determines a coding-unit type, of the N coding-unit types, that corresponds to the current picture; and
   an encoder that encodes the current picture using a particular rate control model that corresponds to the particular coding-unit type when the coding-unit type of the current picture is a particular coding-unit type;
   a convergence determining subsystem that determines whether the particular rate control model converged when the coding-unit type of the current picture is a particular coding-unit type;
   an updating subsystem that updates the particular rate control model when the coding-unit type of the current picture is a particular coding-unit type; and
   a blending subsystem that blends the particular rate control model with a translated second rate control model of the M rate control models corresponding to a second coding-unit type of the N coding-unit types, when the particular rate control model did not converge.

56. An apparatus, comprising:
   a compressed bit stream receiver that receives a first compressed bit stream of one or more pictures;
   a decoder that decodes, fully or partially, the compressed bit stream of one or more pictures;
   a first sending subsystem that sends the fully or partially decoded one or more pictures to one or more of:
      a module for performing temporal analysis on one or more of the fully or partially decoded one or more pictures; and
      a module for performing spatial analysis on one or more of the fully or partially decoded one or more pictures;
   a second sending subsystem that sends, to a rate control model, output from one or more of:
      the performing temporal analysis on the one or more of the fully or partially decoded one or more pictures; and
      the performing spatial analysis on the one or more of the fully or partially decoded one or more pictures;
   a rate control model receiver, at a video coder, that receives rate control parameters from the rate control model and the fully or partially decoded one or more pictures; and
   an encoder-compressor that encodes and compresses the fully or partially decoded one or more pictures using the received rate control parameters into a second bit stream.

57. The method as recited in enumerated example embodiment 6 wherein the complexity relationship relates to one or more of:
   the computed complexity estimate of the current picture with respect to one or more of the anchor pictures; or
   a complexity relationship that exists between at least two of the anchor pictures;
   wherein the at least two of the anchor pictures are predictive, at least in part, of the current picture.

58. The method as recited in enumerated example embodiment 6 wherein the estimating a prediction error step is based, at least in part, on the statistics gathered at the MEMC; and
   further comprising the step of:
   adjusting the statistics based, at least in part, on:
      information from a picture other than a reference picture or an anchor picture; or
      one or more statistics, which are obtained from at least one or a motion compensated temporal filter, transcoding related information, or a previous encoding pass;
      wherein the previous encoding pass is based, at least in part, on a coding configuration other than the coding configuration of the current encoding pass.

59. The method as recited in enumerated example embodiment 6 wherein the estimating the prediction error of two or more previously coded pictures comprises the steps of:
   comparing one or more prediction errors, that correspond to different spatial or temporal distances or different motion models; and
   defining a relationship between the current picture and the previously coded pictures based, at least in part, on the comparing step.

60. The method as recited in enumerated example embodiment 13 wherein the coding parameters describe quantization or Lagrangian parameter values, quantization rounding offset parameters, mode decision thresholds, coding-unit types and configurations, and combinations thereof with which the current picture is encoded.

61. A method, comprising the steps of:
   determining statistics for estimating, in a video encoder, one or more encoding quantization parameters of first frames of a first coding unit type in a stream of encoded video frames from one or more of:
      at least a second frame of the first coding unit type;
      one or more frames of at least a second coding unit type; or
      one or more previously encoded coding unity types;
   wherein one or more of the first, second or previously encoded coding unit types relate to at least one of intra-frames (I-frames), predicted frames (P-frames) or bidirectional frames (B-frames);
   estimating, based at least in part on the determined statistics, one or more relationships between one or more of the first, second or previously encoded coding unit types, wherein the relationships correspond to one or more of bitrates or image qualities, which are associated with each of the coding unit types; and
   controlling the rate with which the encoded video stream is transmitted from the video encoder based on one or more of the quantization parameters or the estimated relationships.

62. The method as recited in enumerated example embodiment 61, further comprising the steps of:
   determining statistics that are generated with a motion estimation and compensation function (MECF) of the video encoder;
   wherein the rate controlling step is further based on the determined MECF statistics.

63. The method as recited in enumerated example embodiment 62, wherein the determining MECF generated statistics comprises the steps of:
receiving information from one or more of:
one or more motion estimation and motion compensation (MEMC) modules;
a spatial statistics analysis module;
a first coding pass; or
a previous pass of a plurality of coding passes; performing one or more of the steps of:
estimating a prediction error of a current picture as a function of at least one of:
a prediction error of two or more previously coded pictures; or
statistics gathered at the MEMC; or
estimating spatial variance of the current picture as a function of spatial variance of previously coded pictures gathered with the spatial statistic analysis module.

64. The method as recited in enumerated example embodiment 63, further comprising the steps of:
receiving a current frame;
determining, from one or more image characteristics corresponding to the received current frame, a scene type that characterizes the current frame;
wherein the determining the scene type for the current picture step comprises analyzing spatio-temporal statistics from at least one of the MEMC module or from a previous coding pass of a multiple-pass video coder
based on the determined scene type, performing one or more of the steps of:
selecting a rate control model that is appropriate for the scene type; or
adjusting parameters associated with a default rate control model; and
performing the rate controlling step based on the default rate control with the adjusted associated parameters.

65. The method as recited in enumerated example embodiment 61, further comprising the steps of:
for one or more coding-units, receiving a coding structure, scaling parameters and bit targets per picture;
computing a number of bits to allocate to each of the one or more coding-units using at least one of:
the coding structure;
the scaling parameters; or
the bit targets;
wherein the computing the number of bits step comprises the steps of:
computing at least one new parameters as a function of the scaling parameters; and
allowing the quantization parameter (QP) values allocated to the first coding unit type to differ from the QP values allocated to one or more of the second coding unit type or the previously encoded coding unit type.

66. The method as recited in enumerated example embodiment 61, further comprising the steps of:
receiving a current frame at the video encoder for a number N of coding unit types;
wherein the video encoder comprises a number M of rate control models and wherein the number N is greater than the number M; and
coding the current frame using one or more of:
specific information relating thereto;
one or more coding parameters from at least one of the M rate control models; or
one or more coding parameters obtained by translating at least one of the coding parameters from the at least one of the M rate control models.

67. The method as recited in enumerated example embodiment 61, further comprising the steps of:
receiving a sequence of images in the encoded video stream wherein a first number of pictures of the image sequence are of the first coding unit type;
encoding the first number of pictures of the image sequence using a first rate control model that corresponds to the first coding-unit type; and
upon encoding the first number of pictures of the image sequence using the first rate control model that corresponds to the first coding unit type, encoding a current frame of the image sequence, wherein the current frame corresponds to a second coding unit type, which differs from the first coding unit type;
wherein the encoding the current frame step comprises the step of:
translating parameters that correspond to the first rate control model;
wherein the translating parameters of the first rate control model step comprises using statistics from at least one of the MEMC module or a previous coding pass; and
encoding the current frame based on the translated parameters.

68. The method as recited in enumerated example embodiment 61, further comprising the steps of:
initializing a number M of rate control models;
for a number N of coding unit type pictures, computing N target bits;
wherein the number N is greater than or equal to the number M;
receiving a current picture;
determining the coding unit type of each of the N coding unit types for the current picture;
when the coding unit type of the current picture is a particular coding-unit type, performing the steps of:
using a particular coding parameter corresponding to the particular coding-unit type or using a particular rate control model, of the M rate control models, which corresponds to the particular coding-unit type;
encoding the current picture based on the particular coding parameter or particular rate control model;
updating a scaling parameter corresponding to the particular coding-unit type; and
re-computing the N target bits for each coding-unit type.

69. A computer readable storage medium product comprising encoded instructions, which when executing with a processor of a computer system, cause the processor to perform a process as recited in one or more enumerated example embodiments 61-69.

70. A system, comprising:
means for determining statistics for estimating, in a video encoder, one or more encoding quantization parameters of first frames of a first coding unit type in a stream of encoded video frames from one or more of:
at least a second frame of the first coding unit type;
one or more frames of at least a second coding unit type; or
one or more previously encoded coding unity types;
wherein one or more of the first, second or previously encoded coding unit types relate to at least one of intra-frames (I-frames), predicted frames (P-frames) or bidirectional frames (B-frames);
means for estimating, based at least in part on the determined statistics, one or more relationships between one or more of the first, second or previously encoded coding unit types, wherein the relationships correspond to one or more of bitrates or image qualities, which are associated with each of the coding unit types; and means for controlling the rate with which the encoded video stream is transmitted from the video encoder based on one or more of the quantization parameters or the estimated relationships.

71. A system, comprising:
a bus that communicatively, electrically, optically or electronically inter-couples one or more components of the system;
a computer readable storage medium that is communicatively, electrically, optically or electronically coupled to the bus and, which comprises encoded instructions; and
one or more processors that are communicatively, electrically, optically or electronically coupled to the bus and interactively inter-coupled with the computer readable storage medium wherein, upon executing one or more of the encoded instructions, controls or causes a process that comprises the steps of:
determining statistics for estimating, in a video encoder, one or more encoding quantization parameters of first frames of a first coding unit type in a stream of encoded video frames from one or more of:
at least a second frame of the first coding unit type;
one or more frames of at least a second coding unit type; or
one or more previously encoded coding unity types;
wherein one or more of the first, second or previously encoded coding unit types relate to at least one of intra-frames (I-frames), predicted frames (P-frames) or bidirectional frames (B-frames);
estimating, based at least in part on the determined statistics, one or more relationships between one or more of the first, second or previously encoded coding unit types, wherein the relationships correspond to one or more of bitrates or image qualities, which are associated with each of the coding unit types; and
controlling the rate with which the encoded video stream is transmitted from the video encoder based on one or more of the quantization parameters or the estimated relationships.

72. An image encoder, comprising:
a component or module for determining statistics for estimating, in a video encoder, one or more encoding quantization parameters of first frames of a first coding unit type in a stream of encoded video frames from one or more of:
at least a second frame of the first coding unit type;
one or more frames of at least a second coding unit type; or
one or more previously encoded coding unity types;
wherein one or more of the first, second or previously encoded coding unit types relate to at least one of intra-frames (I-frames), predicted frames (P-frames) or bidirectional frames (B-frames);
a component or module for estimating, based at least in part on the determined statistics, one or more relationships between one or more of the first, second or previously encoded coding unit types, wherein the relationships correspond to one or more of bitrates or image qualities, which are associated with each of the coding unit types; and
a component or module for controlling the rate with which the encoded video stream is transmitted from the video encoder based on one or more of the quantization parameters or the estimated relationships.

73. An integrated circuit (IC), comprising a plurality of co-functional structural components which, when executing configured, programmed, or structurally functional operations, cause the IC to at least partially control a process as recited in one or more of enumerated example embodiments 61-68.

74. An apparatus product that operates to perform one or more of computing or video encoding functions that comprise one or more of the processes as recited in one or more of enumerated example embodiments 61-68.

75. A use for one or more of a computer, a video encoder, or an IC, comprising one or more of the processes recited in one or more of enumerated example embodiments 61-68.

5.0 Equivalents, Extensions, Alternatives & Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
maintaining, at a video encoder, a first number of rate control models for the first number of coding-unit types in a second number of coding-unit types, each coding-unit type in the first number of coding-unit types corresponding to a respective rate control model in the first number of rate control models, the second number of coding-unit types further comprising one or more coding-unit types not corresponding to any rate control model in the video encoder;
the first number being an integer greater than zero, the second number being an integer greater than the first number;
wherein a rate control model in the first number of rate control model comprises one or more coding parameters for coding pictures of a coding unit type to which the rate control model corresponds;
wherein one or more coding parameters for coding pictures of a coding-unit type in the one or more coding-unit types not corresponding to rate control models in the video encoder are derived from one or more coding parameters in a rate control model in the first number of rate control model;
receiving a current picture at the video encoder, wherein the current picture is characterized by a specific coding-unit type in the one or more coding-unit types not corresponding to any rate control model in the video encoder;
translating one or more coding parameters from a first rate control model in the first number of rate control models to generate a first set of translated parameters, to code pictures of the specific coding unit type, using at least one scaling parameter or translation parameter that is based at least in part on a bit rate relationship between at least two different coding-unit types;
coding the current picture using the first set of translated parameters.

2. The method as recited in claim 1, further comprising:
gathering statistics that relate to one or more other pictures in a sequence of pictures comprising the current picture;
adjusting the at least one scaling parameter or translation parameter based on the statistics;
translating one or more coding parameters from the at least one of the first number of rate control models to a second set of translated parameters;
coding a second picture using at least the second set of translated parameters.

3. The method as recited in claim 2, wherein the statistics are further related to coding-unit types that are associated with at least one of the first number of rate control models.

4. The method as recited in claim 2, wherein the statistics are generated with a motion estimation and compensation function (MECF) of the video encoder.

5. The method as recited in claim 2, wherein gathering statistics comprises performing one or more of:
estimating a prediction error of the current picture as a function of at least one of:
a prediction error of two or more previously coded pictures;
statistics gathered at a motion estimation and motion compensation (MEMC) module.

6. The method as recited in claim 1,
wherein the one or more coding parameters are associated with a first coding unit-type and the first set of translated parameters are associated with a second coding-unit type;
wherein the first coding-unit type is different than the second coding-unit type.

7. The method as recited in claim 6,
wherein the first coding-unit type corresponds to at least one of the first number of rate control models;
wherein the second coding-unit type does not correspond to any of the first number of rate control models.

8. The method as recited in claim 6,
wherein the first coding-unit type relates to one of: intra-frames (I-frames), predicted frames (P-frames) or bi-directional frames (B-frames);
wherein the second coding-unit type relates to a different one of: intra-frames (I-frames), predicted frames (P-frames) or bi-directional frames (B-frames).

9. The method of claim 1, further comprising:
receiving an adapted prediction structure comprising at least one new coding-unit type;
determining whether the new coding-unit type was present previously; and
using gathered statistics and a rate control model of the previously present coding-unit type for coding a second picture when the new coding-unit type was present previously.

10. The method of claim 1, further comprising:
receiving an adapted prediction structure comprising at least one new coding-unit type;
determining whether the new coding-unit type was present previously; and
initializing a rate control model that corresponds to the new coding-unit type by translating a previously maintained rate control model when the new coding-unit type was not present previously.

11. The method of claim 1, further comprising:
determining missing rate control models for the one or more coding-unit types based at least on one or more of: quality or bit rate ratios associated with the previously coded pictures.

12. An integrated circuit (IC), comprising a plurality of co-functional structural components which, when executing configured, programmed, or structurally functional operations, cause the IC to at least partially control a process, the process comprising:
maintaining, at a video encoder, a first number of rate control models for the first number of coding-unit types in a second number of coding-unit types, each coding-unit type in the first number of coding-unit types corresponding to a respective rate control model in the first number of rate control models, the second number of coding-unit types further comprising one or more coding-unit types not corresponding to any rate control models in the video encoder;
the first number being an integer greater than zero, the second number being an integer greater than the first number;
wherein a rate control model in the first number of rate control model comprises one or more coding parameters for coding pictures of a coding unit type to which the rate control model corresponds;
wherein one or more coding parameters for coding pictures of a coding-unit type in the one or more coding-unit types not corresponding to rate control models in the video encoder are derived from one or more coding parameters in a rate control model in the first number of rate control model;
receiving a current picture at the video encoder, wherein the current picture is characterized by a specific coding-unit type in the one or more coding-unit types not corresponding to any rate control model in the video encoder;
translating one or more coding parameters from a first rate control model in the first number of rate control models to generate a first set of translated parameters, to code pictures of the specific coding unit type, using at least one scaling parameter or translation parameter that is based at least in part on a bit rate relationship between at least two different coding-unit types;
coding the current picture using the first set of translated parameters.

13. An apparatus product that operates to perform one or more of computing or video encoding functions that comprise a process, the process comprising:
maintaining, at a video encoder, a first number of rate control models for the first number of coding-unit types in a second number of coding-unit types, each coding-unit type in the first number of coding-unit types corresponding to a respective rate control model in the first number of rate control models, the second number of coding-unit types further comprising one or more coding-unit types not corresponding to any rate control models in the video encoder;
the first number being an integer greater than zero, the second number being an integer greater than the first number;
wherein a rate control model in the first number of rate control model comprises one or more coding parameters for coding pictures of a coding unit type to which the rate control model corresponds;
wherein one or more coding parameters for coding pictures of a coding-unit type in the one or more coding-unit types not corresponding to rate control models in the video encoder are derived from one or more coding parameters in a rate control model in the first number of rate control model;

receiving a current picture at the video encoder, wherein the current picture is characterized by a specific coding-unit type in the one or more coding-unit types not corresponding to any rate control model in the video encoder;

translating one or more coding parameters from a first rate control model in the first number of rate control models to generate a first set of translated parameters, to code pictures of the specific coding unit type, using at least one scaling parameter or translation parameter that is based at least in part on a bit rate relationship between at least two different coding-unit types;

coding the current picture using the first set of translated parameters.

14. A system, comprising:

means for maintaining, at a video encoder, a first number of rate control models for the first number of coding-unit types in a second number of coding-unit types, each coding-unit type in the first number of coding-unit types corresponding to a respective rate control model in the first number of rate control models, the second number of coding-unit types further comprising one or more coding-unit types not corresponding to any rate control models in the video encoder;

the first number being an integer greater than zero, the second number being an integer greater than the first number;

wherein a rate control model in the first number of rate control model comprises one or more coding parameters for coding pictures of a coding unit type to which the rate control model corresponds;

wherein one or more coding parameters for coding pictures of a coding-unit type in the one or more coding-unit types not corresponding to rate control models in the video encoder are derived from one or more coding parameters in a rate control model in the first number of rate control model;

means for receiving a current picture at the video encoder, wherein the current picture is characterized by a specific coding-unit type in the one or more coding-unit types not corresponding to any rate control model in the video encoder;

means for translating one or more coding parameters from a first rate control model in the first number of rate control models to generate a first set of translated parameters, to code pictures of the specific coding unit type, using at least one scaling parameter or translation parameter that is based at least in part on a bit rate relationship between at least two different coding-unit types;

means for coding the current picture using the first set of translated parameters.

15. A non-transitory computer readable storage medium comprising instructions, which when executed by one or more processors performs a process, the process comprising:

maintaining, at a video encoder, a first number of rate control models for the first number of coding-unit types in a second number of coding-unit types, each coding-unit type in the first number of coding-unit types corresponding to a respective rate control model in the first number of rate control models, the second number of coding-unit types further comprising one or more coding-unit types not corresponding to any rate control models in the video encoder;

the first number being an integer greater than zero, the second number being an integer greater than the first number;

wherein a rate control model in the first number of rate control model comprises one or more coding parameters for coding pictures of a coding unit type to which the rate control model corresponds;

wherein one or more coding parameters for coding pictures of a coding-unit type in the one or more coding-unit types not corresponding to rate control models in the video encoder are derived from one or more coding parameters in a rate control model in the first number of rate control model;

receiving a current picture at the video encoder, wherein the current picture is characterized by a specific coding-unit type in the one or more coding-unit types not corresponding to any rate control model in the video encoder;

translating one or more coding parameters from a first rate control model in the first number of rate control models to generate a first set of translated parameters, to code pictures of the specific coding unit type, using at least one scaling parameter or translation parameter that is based at least in part on a bit rate relationship between at least two different coding-unit types;

coding the current picture using the first set of translated parameters.

\* \* \* \* \*